(12) United States Patent
Yazaki et al.

(10) Patent No.: US 12,224,646 B2
(45) Date of Patent: Feb. 11, 2025

(54) ROTATING ELECTRIC MACHINE SYSTEM, AND COMBINED POWER SYSTEM EQUIPPED THEREWITH

(71) Applicant: HONDA MOTOR CO., LTD., Tokyo (JP)

(72) Inventors: Manabu Yazaki, Wako (JP); Tatsuya Choji, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 232 days.

(21) Appl. No.: 18/156,514

(22) Filed: Jan. 19, 2023

(65) Prior Publication Data

US 2023/0265788 A1 Aug. 24, 2023

(30) Foreign Application Priority Data

Jan. 21, 2022 (JP) ................. 2022-007956

(51) Int. Cl.
*H02K 7/00* (2006.01)
*F02B 63/04* (2006.01)
*H02K 5/173* (2006.01)

(52) U.S. Cl.
CPC ........... *H02K 7/003* (2013.01); *F02B 63/042* (2013.01); *H02K 5/1732* (2013.01)

(58) Field of Classification Search
CPC .... F02B 63/042; H02K 7/003; H02K 5/1732; H02K 11/225
See application file for complete search history.

(56) References Cited

U.S. PATENT DOCUMENTS

2003/0217548 A1 11/2003 Sekihara et al.
2005/0096141 A1 5/2005 Ishii

FOREIGN PATENT DOCUMENTS

| JP | 2002-147250 A | | 5/2002 |
|---|---|---|---|
| JP | 2003-343204 A | | 12/2003 |
| JP | 2004-232532 A | | 8/2004 |
| JP | 2005-106029 A | | 4/2005 |
| KR | 20160000420 A | * | 1/2016 |

\* cited by examiner

*Primary Examiner* — Mohamad A Musleh
(74) *Attorney, Agent, or Firm* — Rankin, Hill & Clark LLP

(57) ABSTRACT

In a combined power system, a rotating shaft of a rotating electric machine includes a hollow cylindrical outer shaft and an inner shaft inserted into the hollow interior part of the outer shaft. The inner shaft includes a projecting distal end exposed from the outer shaft. On the projecting distal end, a rotational parameter detector, a retaining member and a restraining member are disposed. The retaining member supports the rotational parameter detector at the projecting distal end. Further, the inner shaft is restrained to the outer shaft by the restraining member.

12 Claims, 10 Drawing Sheets ary Electric Machine System, and Combined Power System Equipped Therewith

CROSS-REFERENCE TO RELATED APPLICATIONS

This application is based upon and claims the benefit of priority from Japanese Patent Application No. 2022-007956 filed on Jan. 21, 2022, the contents of which are incorporated herein by reference.

BACKGROUND OF THE INVENTION

Field of the Invention

The present invention relates to a rotating electric machine system. Further, the present invention relates to a combined power system in which the rotating electric machine system and an internal combustion engine are integrally constructed.

Description of the Related Art

A combined power system is equipped with a rotating electric machine system and an internal combustion engine. As disclosed in JP 2002-147250 A, JP 2005-106029 A, JP 2004-232532 A, and JP 2003-343204 A, in a combined power system, a rotating shaft of a rotating electric machine system and an output shaft of an internal combustion engine are connected on the same axis. Accordingly, the rotating shaft and the output shaft rotate together integrally. A rotating electric machine system functions, for example, as an electrical power generator accompanying the rotating shaft rotating integrally together with the output shaft. The rotating shaft is rotatably supported via a bearing by a rotating electric machine housing in which the rotating electric machine is accommodated.

The rotating electric machine system includes a rotational parameter detector for detecting rotational parameters such as a rotational speed, an angle of rotation, or a number of rotations of the rotating shaft. The rotational parameter detector is arranged, for example, circumferentially around the rotating shaft. In this case, it is possible to detect such rotational parameters accurately.

SUMMARY OF THE INVENTION

There has been a demand for a rotating electric machine system that generates a large amount of electrical power while reducing size and scale. To meet such a demand, it is necessary to rotate the rotating shaft at a high speed. However, in this case, the vibration generated in the rotating shaft becomes large. Thus, it is difficult to detect accurate rotational parameters, and the durability of the rotational parameter detector is reduced.

The present invention has the object of solving the aforementioned problems.

According to one embodiment of the present invention, a rotating electric machine system is provided. The rotating electric machine system includes a rotating electric machine and a rotating electric machine housing configured to rotatably support a rotating shaft of the rotating electric machine, wherein the rotating shaft includes a hollow cylindrical outer shaft, and an inner shaft configured to be removably inserted in a hollow interior part of the outer shaft, the outer shaft includes a first outer shaft end part and a second outer shaft end part that are positioned opposite to each other in an axial direction of the rotating shaft, the inner shaft includes a first inner shaft end part and a second inner shaft end part that are positioned opposite to each other in the axial direction, and the first inner shaft end part of the inner shaft includes a projecting distal end that is exposed from the first outer shaft end part of the outer shaft, the rotating electric machine system including a rotational parameter detector provided on the projecting distal end, and configured to detect a rotational parameter of the rotating shaft, a retaining member provided on the projecting distal end, and configured to retain the rotational parameter detector on the projecting distal end, and a restraining member provided on the projecting distal end, and configured to restrain the inner shaft to the outer shaft.

According to another embodiment of the present invention, there is provided a combined power system including the rotating electric machine system described above.

According to the present invention, the inner shaft is restrained to the outer shaft by the restraining member. Therefore, the inner shaft is unlikely to be eccentric with respect to the outer shaft. Therefore, even when the rotating shaft is rotated at a high speed, it is possible to suppress vibration of the rotating shaft.

The above and other objects, features, and advantages of the present invention will become more apparent from the following description when taken in conjunction with the accompanying drawings, in which preferred embodiments of the present invention are shown by way of illustrative example.

DETAILED DESCRIPTION OF THE INVENTION

Hereinafter, the respective terms "left", "right", "lower", and "upper" refer specifically to the left, right, lower and upper directions shown in FIGS. 3 to 6, FIG. 9, and FIG. 10. However, these directions are provided for the sake of convenience in order to simplify the description and facilitate understanding. In particular, the directions described in the specification are not limited to the directions when the combined power system is actually used.

Figure 1:
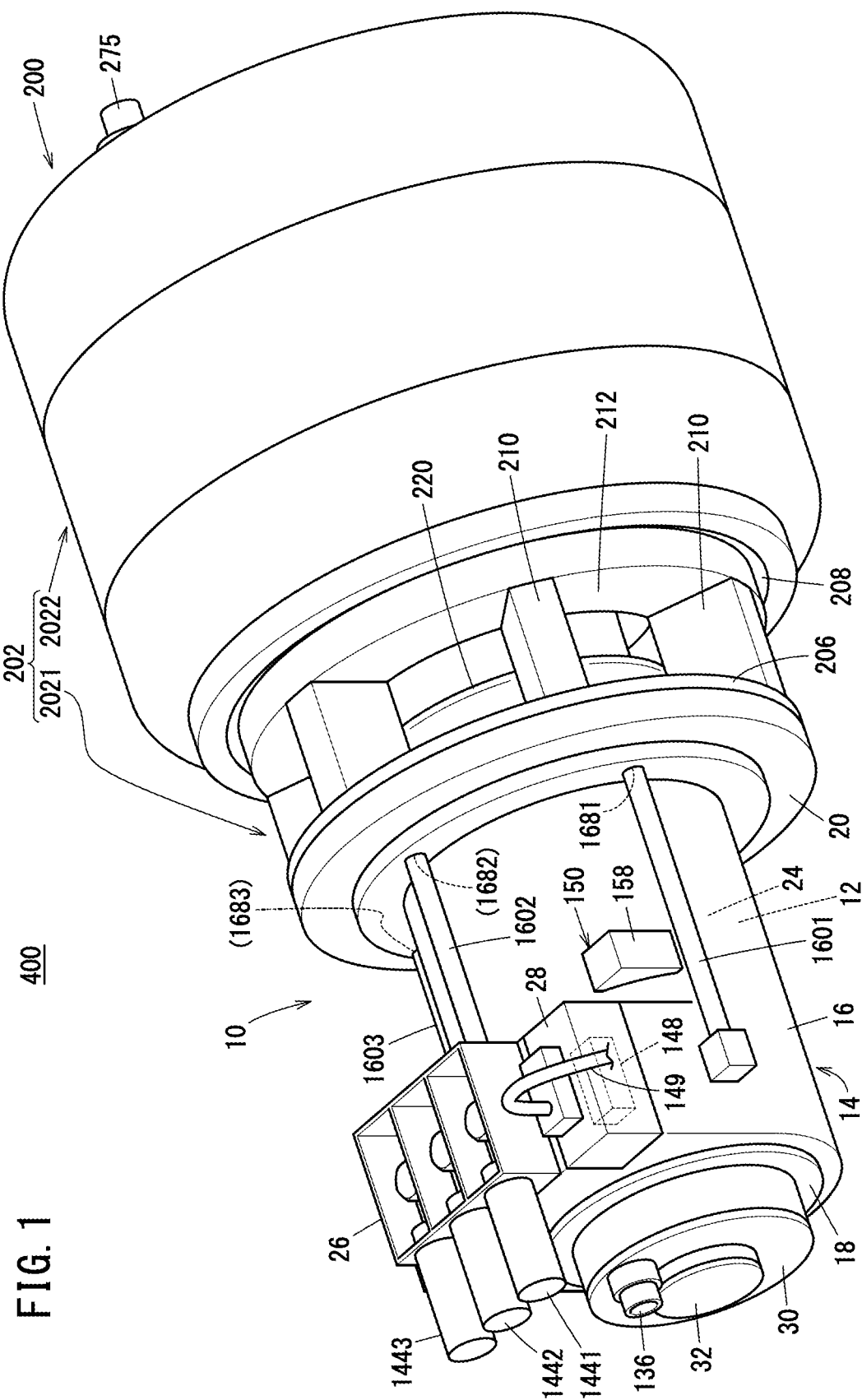
FIG. 1 is a schematic overall perspective view of a combined power system according to an embodiment of the present invention.

FIG. 1 is a schematic overall perspective view of a combined power system 400 according to a present embodiment. The combined power system 400 is equipped with a rotating electric machine system 10, and a gas turbine engine 200 as an internal combustion engine. An axis extending along a longitudinal direction (axial direction) through a diametrical center of the rotating electric machine system 10 coincides with an axis extending along a longitudinal direction (axial direction) through a diametrical center of the gas turbine engine 200. Stated otherwise, the rotating electric machine system 10 and the gas turbine engine 200 are arranged on the same axis.

Hereinafter, the left end in the axial direction of each of the rotating electric machine system 10 and the gas turbine engine 200 may be referred to as a first end. Similarly, the right end in the axial direction of each of the rotating electric machine system 10 and the gas turbine engine 200 may also be referred to as a second end. More specifically, in the rotating electric machine system 10, the left end part which is separated away from the gas turbine engine 200 is the first end. In the rotating electric machine system 10, the right end part which is in close proximity to the gas turbine engine 200 is the second end. Further, in the gas turbine engine 200, the left end part which is in close proximity to the rotating electric machine system 10 is the first end. In the gas turbine engine 200, the right end part which is separated away from the rotating electric machine system 10 is the second end. According to these definitions, in the illustrated example, the gas turbine engine 200 is disposed at the second end of the rotating electric machine system 10. The rotating electric machine system 10 is disposed at the first end of the gas turbine engine 200.

The combined power system 400 is used, for example, as a power source for providing propulsion in a flying object, a ship, an automobile, or the like. Suitable specific examples of the flying object include drones and multi-copters. The combined power system 400, when mounted on a flying object, is used as a power drive source for rotationally urging, for example, a prop, a ducted fan, or the like. The combined power system 400, when mounted on a ship, is used as a screw rotational force generating device. The combined power system 400, when mounted on an automobile, is used as a power drive source for rotating a motor.

The combined power system 400 can also be used as an auxiliary power source in an aircraft, a ship, a building, or the like. Apart therefrom, it is also possible to utilize the combined power system 400 as gas turbine power generation equipment.

As will be discussed later, the gas turbine engine 200 is an internal combustion engine. Further, the gas turbine engine 200 serves as a gas supply device that supplies compressed air.

Figure 2:
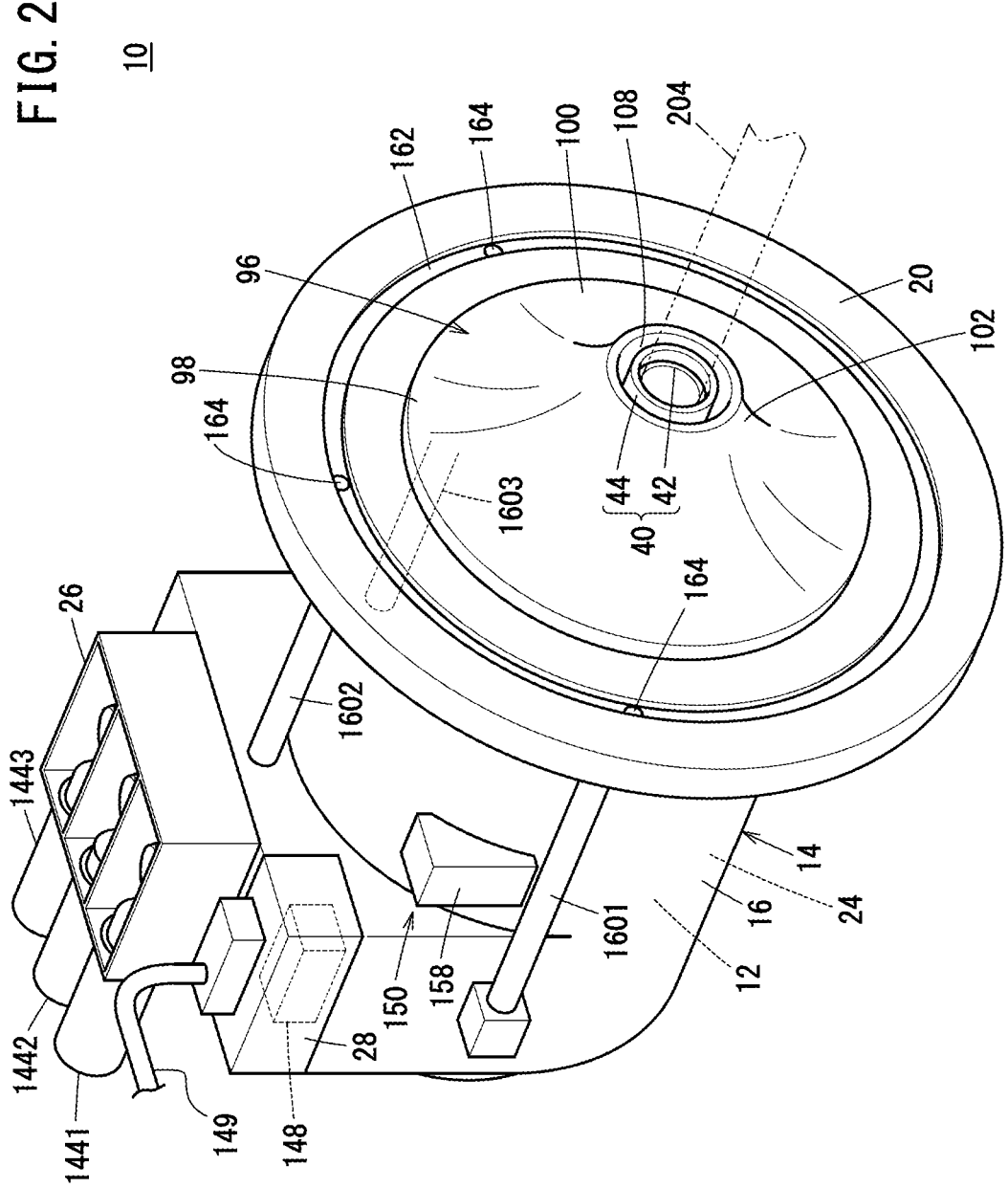
FIG. 2 is a schematic overall perspective view of a rotating electric machine system according to an embodiment of the present invention.
Figure 3:
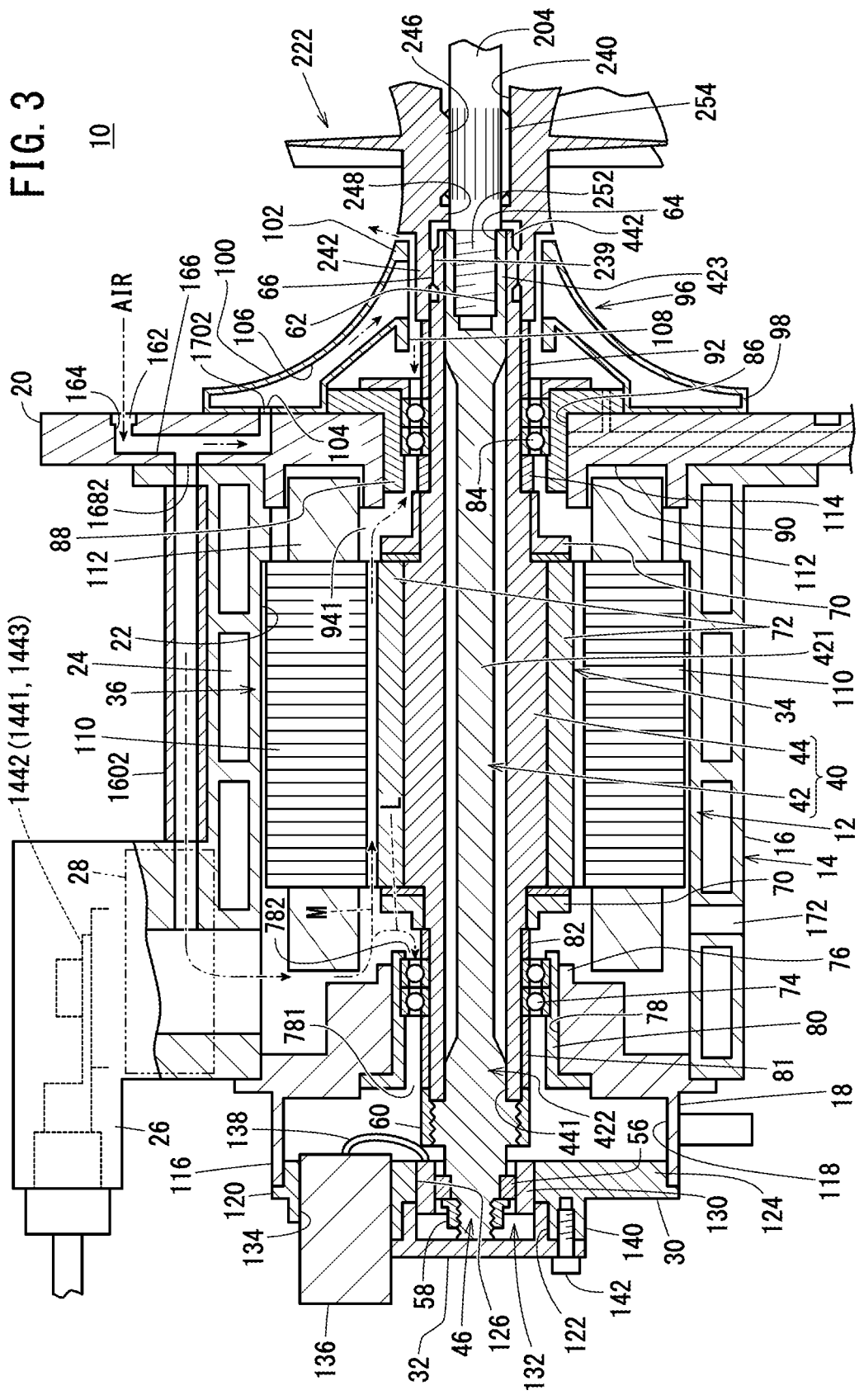
FIG. 3 is a schematic side cross-sectional view of the rotating electric machine system.

First, a description will be given concerning the rotating electric machine system 10. FIG. 2 is a schematic overall perspective view of the rotating electric machine system 10. FIG. 3 is a schematic side cross-sectional view of the rotating electric machine system 10. The rotating electric machine system 10 is equipped with a rotating electric machine 12 (for example, an electrical power generator) and a rotating electric machine housing 14 that accommodates the rotating electric machine 12.

The rotating electric machine housing 14 includes a main housing 16, a first sub-housing 18, and a second sub-housing 20. The main housing 16 exhibits a generally cylindrical shape, and both a first end and a second end thereof are open ends. The first sub-housing 18 is coupled to the first end (left open end) of the main housing 16. The second sub-housing 20 is coupled to the second end (right open end) of the main housing 16. In the manner described above, the first end and the second end of the main housing 16 are closed.

The main housing 16 has a thick side wall that extends in a left-right direction. An accommodation chamber 22 is formed in the interior of the side wall. The majority of the components of the rotating electric machine 12 are accommodated in the accommodation chamber 22.

A spiral cooling jacket 24 is formed in the interior of the side wall of the main housing 16. A cooling medium flows through the cooling jacket 24. As a specific example of the cooling medium, there may be cited cooling water. In this case, the cooling jacket 24 is a water jacket.

On an outer surface (an outer side wall) of the side wall of the main housing 16, in the vicinity of an edge of the first end, a first casing 26 and a second casing 28 are disposed. The first casing 26 and the second casing 28 are portions of the main housing 16. That is, the first casing 26 and the second casing 28 are disposed integrally with the main housing 16. As will be described later, the first casing 26 is a terminal casing. The second casing 28 is a measuring instrument casing.

A retaining member that retains the rotational parameter detector is connected to the first sub-housing 18. According to the present embodiment, as the rotational parameter detector, a resolver 132 is exemplified. Accordingly, hereinafter, the retaining member of the rotational parameter detector will be referred to as a "resolver holder 30". As will be discussed later, a cap cover 32 is connected via screws to the resolver holder 30.

The rotating electric machine 12 includes a rotor 34, and a stator 36 that surrounds an outer circumference of the rotor 34.

The rotor 34 includes a rotating shaft 40. The rotating shaft 40 includes an inner shaft 42 and a hollow cylindrical outer shaft 44. Both ends of the outer shaft 44 are open ends. More specifically, the outer shaft 44 has a left open end 441 (refer to FIG. 4) as a first outer shaft end part and a right open end 442 (refer to FIG. 6) as a second outer shaft end part. The inner shaft 42 is removably inserted in the interior of the outer shaft 44.

The inner shaft 42 is longer in comparison with the outer shaft 44. The inner shaft 42 includes a columnar part 421, a left end part 422 (refer to FIG. 4) as a first inner shaft end part, and a right end part 423 (refer to FIG. 6) as a second inner shaft end part.

The right end part 423 is continuous with the right side of the columnar part 421. Accordingly, the right end part 423 is another end part (a second end) of the inner shaft 42 that is in close proximity to the gas turbine engine 200. The diameter of the right end part 423 is greater than the diameter of the columnar part 421. Moreover, in the illustrated example, the right end part 423 of the inner shaft 42 and the right open end 442 of the outer shaft 44 are flush with each other. However, the right end part 423 may be positioned slightly closer to the second end from the right open end 442.

Figure 4:
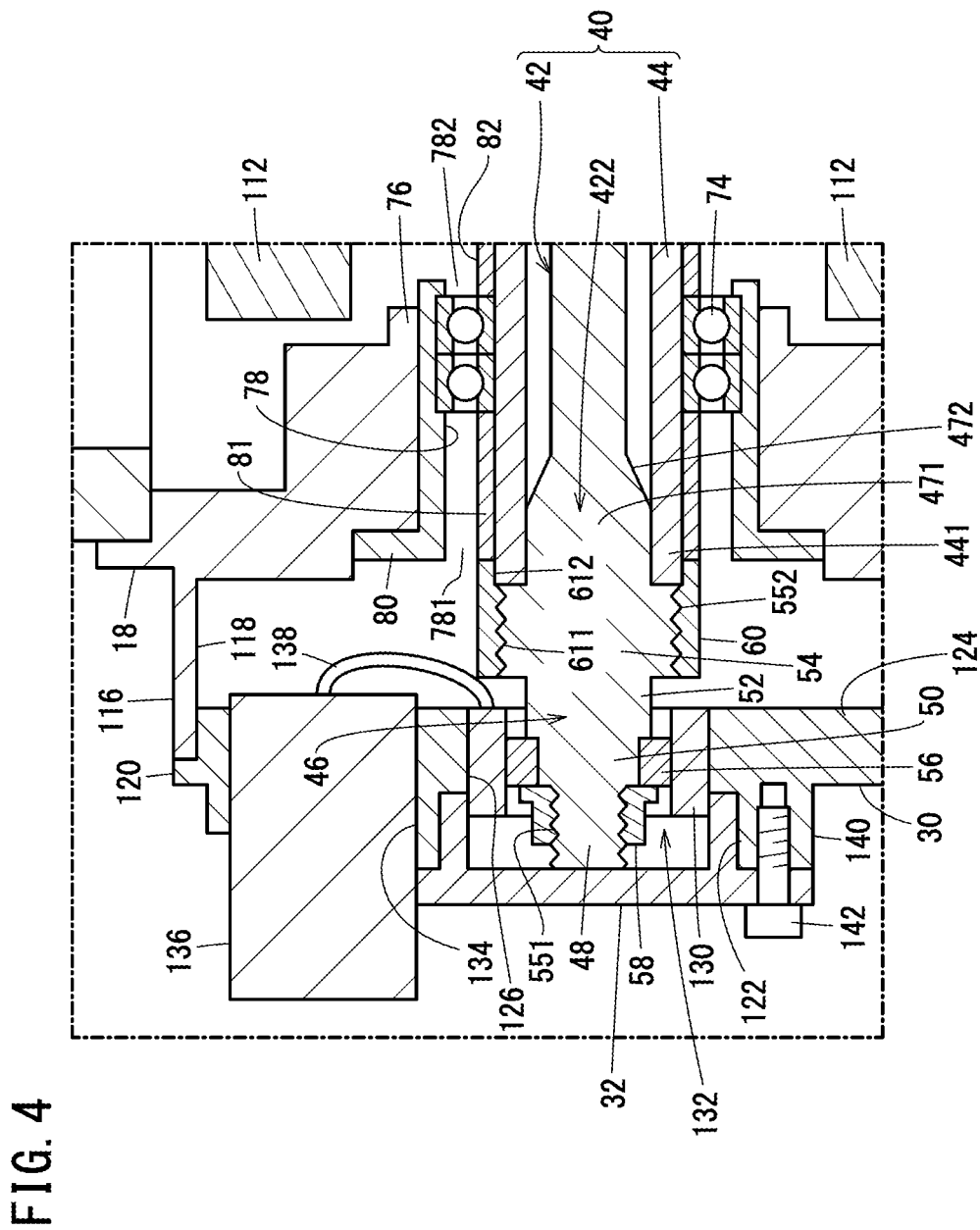
FIG. 4 is an enlarged view of main components shown in FIG. 3.

The left end part 422 is continuous with the left side of the columnar part 421. Accordingly, the left end part 422 is one end part (first end) of the inner shaft 42 that is separated away from the gas turbine engine 200. As shown in FIG. 4, the left end part 422 includes a projecting distal end 46, a constant diameter part 471, and an enlarged diameter part 472. The projecting distal end 46, the constant diameter part 471, and the enlarged diameter part 472 are arranged in this order in a direction toward the columnar part 421.

The projecting distal end 46 is a part of the left end part 422 exposed from the left open end 441 of the outer shaft 44. The projecting distal end 46 includes a small diameter portion 48, a flange portion 50, a stopper portion 52, and a large diameter portion 54. The outer diameters of the small diameter portion 48, the flange portion 50, the stopper portion 52, and the large diameter portion 54 become larger in this order.

The diameter (outer diameter) of the large diameter portion 54 is largest among all the portions of the inner shaft 42, and is larger than an inner diameter of the outer shaft 44. Therefore, the right end of the large diameter portion 54 is in contact with an edge of the left open end 441 of the outer shaft 44. Accordingly, in the inner shaft 42, a portion thereof more in the leftward direction than the large diameter portion 54 is not inserted into the outer shaft 44. Therefore, a state in which the projecting distal end 46 is exposed from the left open end 441 of the outer shaft 44 is maintained.

In the projecting distal end 46, a first external thread 551 is formed on a side circumferential wall (outer surface) of the small diameter portion 48. In the projecting distal end 46, a second external thread 552 (first thread) is formed on a side circumferential wall (outer surface) of the large diameter portion 54. The second external thread 552 is formed between the left open end 441 of the outer shaft 44 and a resolver rotor 56 in the axial direction of the rotating shaft 40.

Figure 5:
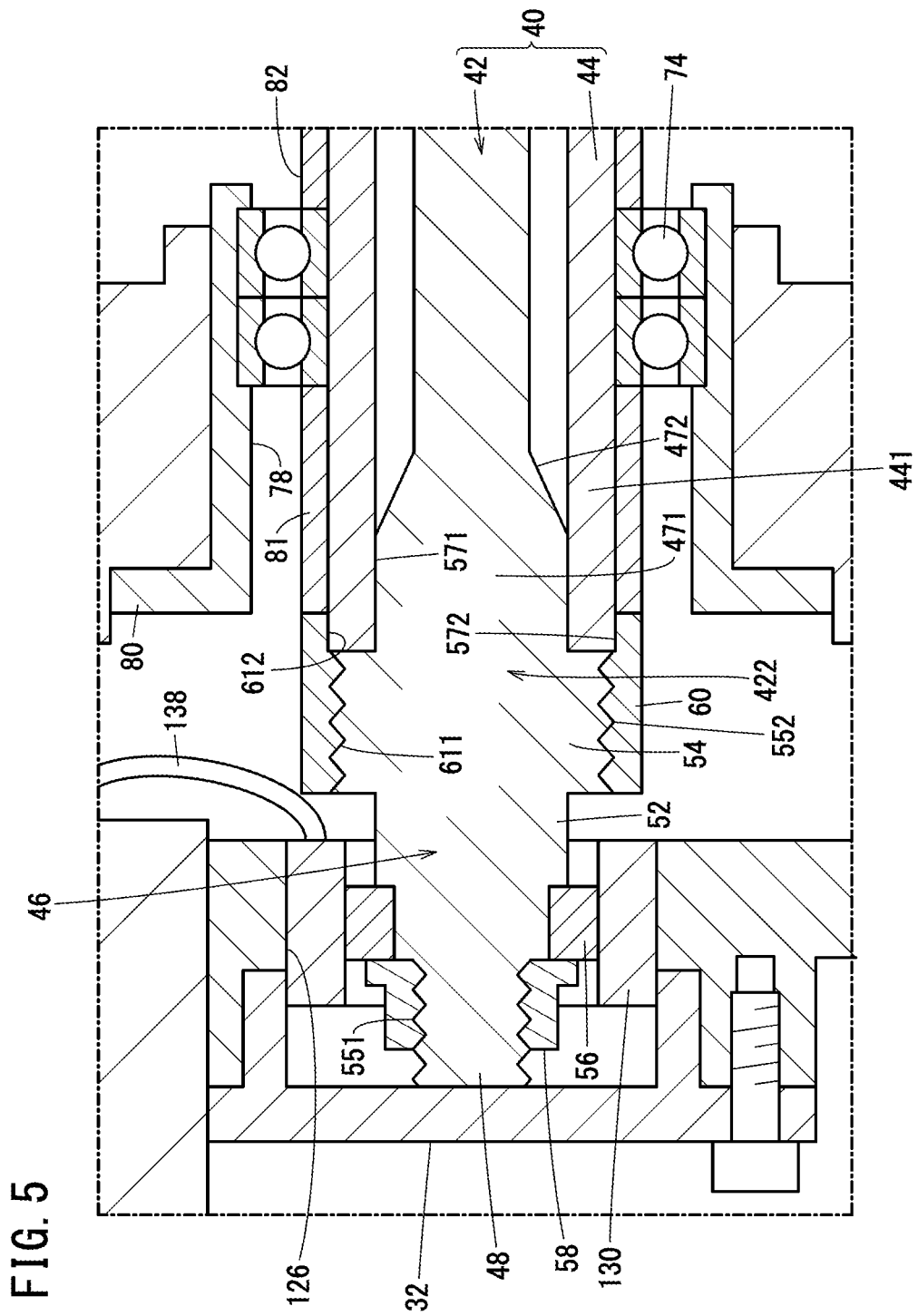
FIG. 5 is an enlarged view of main components shown in FIG. 4.

The constant diameter part 471 and the enlarged diameter part 472 are inserted into the outer shaft 44. The constant diameter part 471 of these parts protrudes from the right end of the large diameter portion 54. The diameter of the constant diameter part 471 is smaller than the diameter of the large diameter portion 54 and larger than the diameter of the columnar part 421. The diameter difference between the diameter of the constant diameter part 471 and the inner diameter of the left open end 441 of the outer shaft 44 is about 20 μm. For example, the diameter of the constant diameter part 471 is about 20 μm smaller than the inner diameter of the left open end 441 of the outer shaft 44. Accordingly, the constant diameter part 471, which is a portion of the inner shaft 42, and the left open end 441 of the outer shaft 44 are fitted to each other in a spigot-and-socket manner. That is, as shown in FIGS. 4 and 5, a first spigot-fitting portion 571 is formed between the constant diameter part 471 and the left open end 441. In the case where the diameter of the constant diameter part 471 is larger than the inner diameter of the left open end 441 of the outer shaft 44 by about 20 μm, the constant diameter part 471 is lightly press-fitted into the left open end 441. As described above, the spigot fitting includes light press-fitting.

The enlarged diameter part 472 is a portion whose diameter is gradually enlarged in a direction away from the columnar part 421, or gradually reduced in a tapered shape in the opposite direction. The left end of the enlarged diameter part 472 is continuous with the right end of the constant diameter part 471. The diameter of the left end of the enlarged diameter part 472 is equal to the diameter of the right end of the constant diameter part 471. The right end of the enlarged diameter part 472 is continuous with the left end of columnar part 421. The diameter of the right end of the enlarged diameter part 472 is equal to the diameter of the left end of the columnar part 421.

The resolver rotor 56 is attached to the flange portion 50. A small cap nut 58 is screwed onto the first external thread 551. The right end of the resolver rotor 56 abuts against the stopper portion 52. Therefore, the resolver rotor 56 stops. In this state, a left end of the resolver rotor 56 is pressed by the small cap nut 58. As described above, the resolver rotor 56 is held between the small cap nut 58 and the stopper portion 52 in the axial direction, and the resolver rotor 56 is positioned and fixed to the flange portion 50.

The second external thread 552 is covered with a large cap nut 60. Here, an inner thread 611, which is a second thread, is formed on a part of the inner circumferential wall (inner surface) of the large cap nut 60. The inner thread 611 reaches a left end of the inner circumferential wall of the large cap nut 60. The inner thread 611 is screw-engaged with the second external thread 552. Due to this screw-engagement, a force that pulls the inner shaft 42 to the right acts on the inner shaft 42 from the large cap nut 60. By this force, a right end surface of the large diameter portion 54 comes into contact with an edge surface of the left open end 441 of the outer shaft 44, whereby the inner shaft 42 is positioned.

In the large cap nut 60, the inner thread 611 is not formed on the inner circumferential wall in the vicinity of the right open end. Therefore, in the right end part of the large cap nut 60, an accommodation hole 612 is formed between the right open end and a right end of the inner thread 611.

When the second external thread 552 is screw-engaged with the inner thread 611, the left open end 441 of the outer shaft 44 is inserted into the accommodation hole 612. Here, a diameter difference between an inner diameter of the accommodation hole 612 and an outer diameter of the left open end 441 is about 20 μm. For example, the outer diameter of the left open end 441 is about 20 μm smaller than the inner diameter of the accommodation hole 612. Accordingly, the inner circumferential wall of the accommodation hole 612 and the left open end 441, which is a portion of the outer shaft 44, are fitted to each other in a spigot-and-socket manner. As a result, as shown in FIGS. 4 and 5, a second spigot-fitting portion 572 is formed between the large cap nut 60 and the left open end 441. In accordance with the second spigot-fitting portion 572, the left end part 422 of the inner shaft 42 is restrained by the left open end 441 of the outer shaft 44. In this way, the large cap nut 60 is a restraining member that restrains the inner shaft 42 to the outer shaft 44.

In a case where the outer diameter of the left open end 441 is larger than the inner diameter of the accommodation hole 612 by about 20 μm, the left open end 441 is lightly press-fitted into the accommodation hole 612. As described above, this spigot fitting also includes light press-fitting.

As understood from the above description, in the present embodiment, the constant diameter part 471 (a part of the left end part 422) of the inner shaft 42 and the left open end 441 of the outer shaft 44 are fitted to each other in a spigot-and-socket manner. In addition, the inner circumferential wall of the accommodation hole 612 of the large cap nut 60 (restraining member) and the left open end 441 of the outer shaft 44 are fitted to each other in a spigot-and-socket manner. As described above, the spigot fitting includes light press-fitting.

The first external thread 551 and the second external thread 552 are so-called reverse threads. Accordingly, when screw-engaged, the small cap nut 58 and the large cap nut 60 are rotated counterclockwise. After being screw-engaged, it is preferable to partially deform the screw threads of the small cap nut 58 and the large cap nut 60. In accordance with this feature, the small cap nut 58 and the large cap nut 60 are prevented from becoming loosened.

Figure 6:
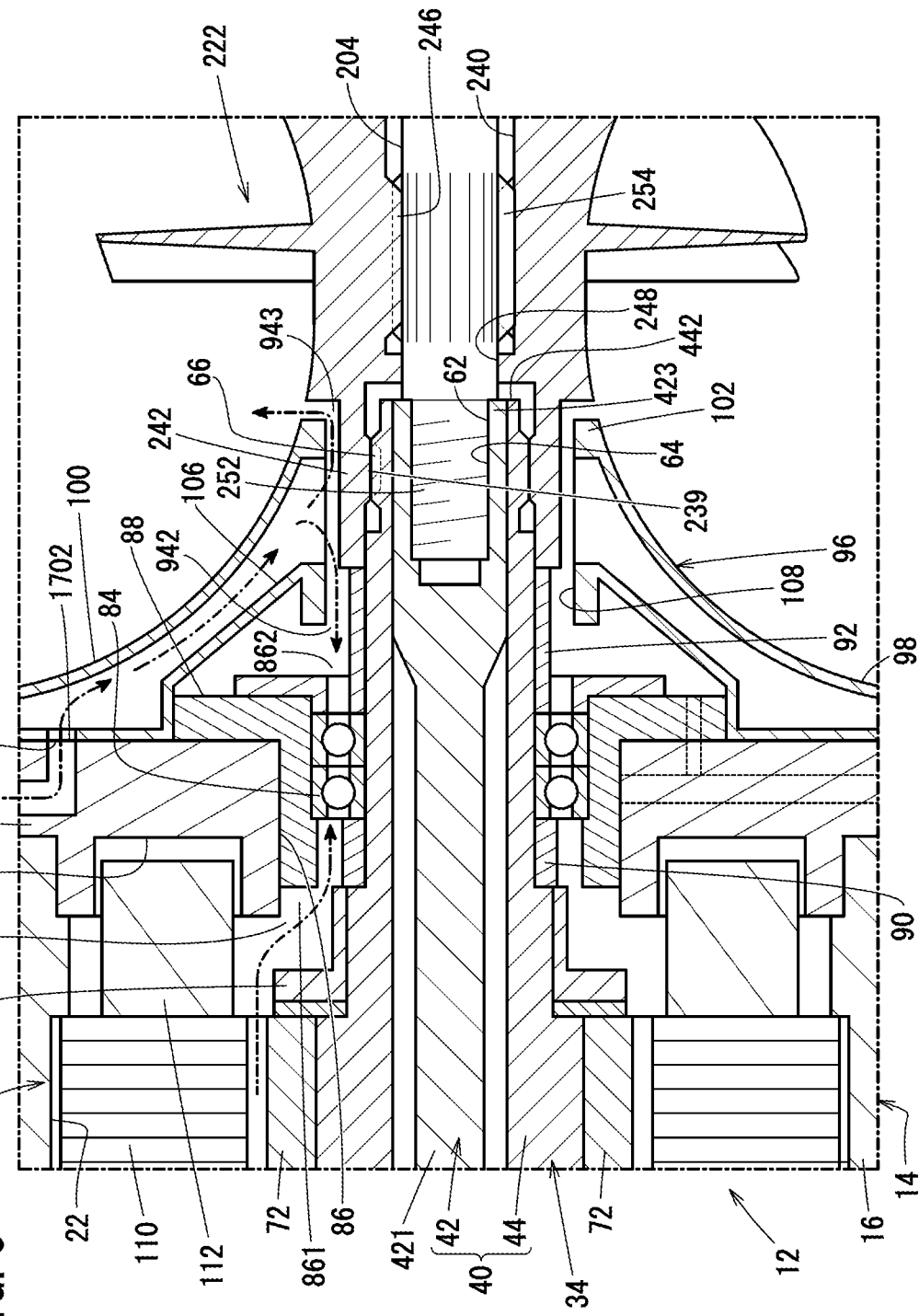
FIG. 6 is an enlarged view of main components shown in FIG. 3 at a location different from that shown in FIG. 4.

As shown in FIG. 6, a connecting hole 62 is formed in the right end part 423 which is the second end of the inner shaft 42. The connecting hole 62 extends toward the left end part 422 which is the first end. A female thread 64 is engraved on an inner circumferential wall of the connecting hole 62. The left end of an output shaft 204 is inserted into the connecting hole 62. The left end of the output shaft 204 is coupled to the inner shaft 42 by being screwed into the female thread 64. A compressor wheel 222 and a turbine wheel 224 (refer to FIG. 9) are retained on the output shaft 204.

Further, a first inner spline 66 is formed on the outer circumferential wall of the right open end 442 of the outer shaft 44. The first inner spline 66 extends along the axial direction (left-right direction) of the rotating electric machine system 10.

As shown in FIG. 3, an outer diameter of a substantially central portion in a longitudinal direction of the outer shaft 44 is maximum. A plurality of permanent magnets 72 are retained via magnet holders 70 on the large diameter central portion. In the two permanent magnets 72 that are adjacent to each other, polarities thereof which are different from each other face outward. As the rotating shaft 40 undergoes rotation, the permanent magnets 72 move along a circumference of a predetermined virtual circle about the center of rotation of the rotating shaft 40.

A left end (first end) of the rotating shaft 40 is rotatably supported by the first sub-housing 18 via a first bearing 74. As shown in FIG. 3, the first bearing 74 is inserted between the outer shaft 44 and the first sub-housing 18. Specifically, the first sub-housing 18 has a columnar shaped projecting portion 76 that is projected out toward the main housing 16. A first insertion hole 78 is formed in the columnar shaped projecting portion 76. A first bearing holder 80 by which the first bearing 74 is retained is inserted into the first insertion hole 78. Accordingly, the first bearing 74 is arranged in the first insertion hole 78.

The first insertion hole 78 extends along the left-right direction. The left end of the first insertion hole 78 is separated farther away from the output shaft 204 than the right end of the first insertion hole 78. Hereinafter, the left end of the first insertion hole 78 may also be referred to as a "first distal end 781". On the other hand, the right end of the first insertion hole 78 is in closer proximity to the output shaft 204 than the left end (the first distal end 781) of the first insertion hole 78. Hereinafter, the right end of the first insertion hole 78 may also be referred to as a "first proximal end 782".

A first outer stopper 81 positioned at the first distal end 781, and a first inner stopper 82 positioned at the first proximal end 782 are installed on a small diameter left end of the outer shaft 44. The first bearing 74 is sandwiched and held between the first outer stopper 81 and the first inner stopper 82. Based on being sandwiched and held therebetween, the first bearing 74 is positioned and fixed in place. A clearance is formed between the first outer stopper 81 and the columnar shaped projecting portion 76.

A distal end of the left end part of the rotating shaft 40 passes through the first insertion hole 78 after having passed through an inner hole of the first bearing 74. The distal end of the left end part of the rotating shaft 40 is further exposed on an outer side (a hollow concave portion 118) of the columnar shaped projecting portion 76. Furthermore, at the left end part of the rotating shaft 40, the projecting distal end 46 of the inner shaft 42 is exposed from the left open end 441 of the outer shaft 44. As described above, the projecting distal end 46 includes the small diameter portion 48, the flange portion 50, the stopper portion 52, and the large diameter portion 54 (see FIG. 4).

A right end (second end) of the rotating shaft 40 is rotatably supported by the second sub-housing 20 via a second bearing 84. As shown in FIG. 6, the second bearing 84 is inserted between the outer shaft 44 and the second sub-housing 20 which exhibits a substantially disk shape.

The second sub-housing 20 is connected to the main housing 16 via non-illustrated bolts. A center of the second sub-housing 20 forms a thick-walled cylindrical portion. A second insertion hole 86 is formed in such a cylindrical portion. The second insertion hole 86 extends along the left-right direction. The left end of the second insertion hole 86 is separated farther away from the output shaft 204 than the right end of the second insertion hole 86. Hereinafter, the left end of the second insertion hole 86 is also referred to as a "second distal end 861". On the other hand, the right end of the second insertion hole 86 is in closer proximity to the output shaft 204 than the left end (the second distal end 861) of the second insertion hole 86. Hereinafter, the right end of the second insertion hole 86 may also be referred to as a "second proximal end 862".

A second bearing holder 88 by which the second bearing 84 is retained is inserted into the second insertion hole 86. Accordingly, the second bearing 84 is arranged in the second insertion hole 86. The second bearing 84 is sandwiched and held between a second inner stopper 90 located at the second distal end 861 and a second outer stopper 92 located at the second proximal end 862. Based on being sandwiched and held therebetween, the second bearing 84 is positioned and fixed.

Further, at the second distal end 861, a clearance is formed between the second inner stopper 90 and the second bearing holder 88. This clearance defines a first sub-branching passage 941. A lubricating oil is supplied to the first bearing 74 and the second bearing 84 via a lubricating oil flow path (not shown).

As shown in FIG. 2, a rectifying member 96 is coupled to an end surface of the second sub-housing 20 facing the gas turbine engine 200. The rectifying member 96 includes a base portion 98, a reduced diameter portion 100, and a top portion 102. The base portion 98 facing toward the second sub-housing 20 has a large diameter and thin-walled cylindrical plate shape. The top portion 102 which faces toward the gas turbine engine 200 has a small diameter and a relatively long cylindrical plate shape. In the reduced diameter portion 100 between the base portion 98 and the top portion 102, the diameter thereof gradually becomes smaller. Accordingly, the rectifying member 96 is a mountain shaped (chevron shaped) body or a bottomless cup shaped body. The outer surface of the reduced diameter portion 100 is a smooth surface with a small surface roughness.

In the base portion 98, inlet ports 104 are formed in an end surface thereof facing toward the second sub-housing 20. Further, the reduced diameter portion 100 is hollow. More specifically, a relay chamber 106 is formed in the interior of the reduced diameter portion 100. The inlet ports 104 serve as inlet ports for the compressed air to enter into the relay chamber 106.

An insertion hole 108 is formed in the top portion 102 along the left-right direction. A diameter (an opening diameter) of the insertion hole 108 is larger than the outer diameter of a portion of the second outer stopper 92 that extends along the rotating shaft 40. Therefore, a portion of the second outer stopper 92 that has entered into the insertion hole 108 and the outer circumferential wall are separated away from the inner wall of the insertion hole 108. Stated otherwise, a clearance is formed between the outer circumferential wall of the second outer stopper 92 and the inner wall of the insertion hole 108. This clearance defines a second sub-branching passage 942. The relay chamber 106 becomes wider as it comes closer in proximity to the insertion hole 108 and the second sub-branching passage 942.

Further, a diameter (opening diameter) of the insertion hole 108 is larger than the outer diameter of the relatively small left end (a small diameter cylindrical portion 242) of the compressor wheel 222. Therefore, the small diameter cylindrical portion 242 that has entered into the insertion hole 108 is also separated away from the inner wall of the insertion hole 108. Stated otherwise, a clearance is formed between an outer circumferential wall of the small diameter cylindrical portion 242 and the inner wall of the insertion hole 108. This clearance defines an outlet passage 943.

As shown in FIG. 3, the first insertion hole 78 and the first sub-branching passage 941 communicate with the accommodation chamber 22. Therefore, the first bearing 74 and the second bearing 84 are exposed in the accommodation chamber 22.

The stator 36 constitutes the rotating electric machine 12 together with the aforementioned rotor 34. The stator 36 includes an electromagnetic coil 110 and a plurality of insulating base members 112. The electromagnetic coil 110 comprises three types of coils, including a U-phase coil, a V-phase coil, and a W-phase coil, and is wound around the insulating base members 112. In the case that the rotating electric machine 12 is a generator, the rotating electric machine 12 is a so-called three-phase power source. The plurality of insulating base members 112 are arranged in an annular shape. Due to being arranged in this manner, an inner hole is formed in the stator 36.

The stator 36 is accommodated in the accommodation chamber 22. In this instance, the second sub-housing 20 serves as a stator holder. That is, an annular concave portion 114 is formed in the second sub-housing 20. The insulating base members 112 included in the stator 36 are engaged with the annular concave portion 114. Due to such engagement, the stator 36 is positioned and fixed in place. Furthermore, the columnar shaped projecting portion 76 enters into a left opening of the inner hole of the stator 36.

The inner wall of the accommodation chamber 22 and the electromagnetic coil 110 are slightly separated away from each other. By this separation, the main housing 16 and the electromagnetic coil 110 are electrically insulated from each other.

A clearance is formed between the outer circumferential wall of the columnar shaped projecting portion 76 and the insulating base members 112. A clearance is also formed between the outer walls of the permanent magnets 72 and the inner wall of the electromagnetic coil 110. As will be discussed later, compressed air, which is a gas, flows through these clearances. Stated otherwise, these clearances make up one part of a compressed air flow passage.

As shown in FIG. 4, the first sub-housing 18 has an annular convex portion 116 that projects out in an annular shape. The hollow concave portion 118 is formed on an inner side of the annular convex portion 116. The projecting distal end 46, which is one portion of the left end part 422 of the inner shaft 42, enters into the hollow concave portion 118.

The resolver holder 30 is provided on the annular convex portion 116. The resolver holder 30 includes a flange shaped stopper 120 that protrudes out in a diametrical direction. The flange shaped stopper 120 has a greater diameter than the inner diameter of the annular convex portion 116. Accordingly, the flange shaped stopper 120 abuts against the annular convex portion 116. Due to abutting in this manner, the resolver holder 30 is positioned. In this state, the resolver holder 30 is connected to the first sub-housing 18, for example, via mounting bolts (not shown).

A small cylindrical portion 122 is provided in the resolver holder 30 on a left side of the flange shaped stopper 120. Further, a large cylindrical portion 124 is provided on a right side of the flange shaped stopper 120. The large cylindrical portion 124 has a larger diameter than the small cylindrical portion 122. A retaining hole 126 is formed in the resolver holder 30. Most part of a resolver stator 130 is fitted into the retaining hole 126. Due to being fitted therein in this manner, the resolver stator 130 is retained by the resolver holder 30.

When the large cylindrical portion 124 enters into the hollow concave portion 118 and the flange shaped stopper 120 abuts against the annular convex portion 116, the resolver rotor 56 is positioned in the inner hole of the resolver stator 130. The resolver stator 130 and the resolver rotor 56 constitute the resolver 132. The resolver 132 is a rotational parameter detector. According to the present embodiment, the resolver 132 detects an angle of rotation of the inner shaft 42. Moreover, as noted previously, the resolver rotor 56 is retained by the flange portion 50 on the left end part 422 of the inner shaft 42.

An engagement hole 134 is formed in the flange shaped stopper 120. A transmission connector 136 is engaged with the engagement hole 134. The resolver stator 130 and the transmission connector 136 are electrically connected via a signal line 138. Moreover, a reception connector of a receiver (not shown) is inserted into the transmission connector 136. The resolver 132 and the receiver are electrically connected via the transmission connector 136 and the reception connector. The receiver receives signals emitted by the resolver 132.

A plurality of tab portions 140 are provided on the small cylindrical portion 122. One of such tab portions 140 is shown in FIG. 3. Moreover, it should be noted that the tab portions 140 are omitted from being shown in FIG. 1. Furthermore, the small cylindrical portion 122 is covered by the cap cover 32. The cap cover 32 closes a left opening of the small cylindrical portion 122 and shields the left end part 422 of the inner shaft 42. Moreover, it should be noted that the cap cover 32 is connected to the tab portions 140 via connecting bolts 142.

Figure 7:
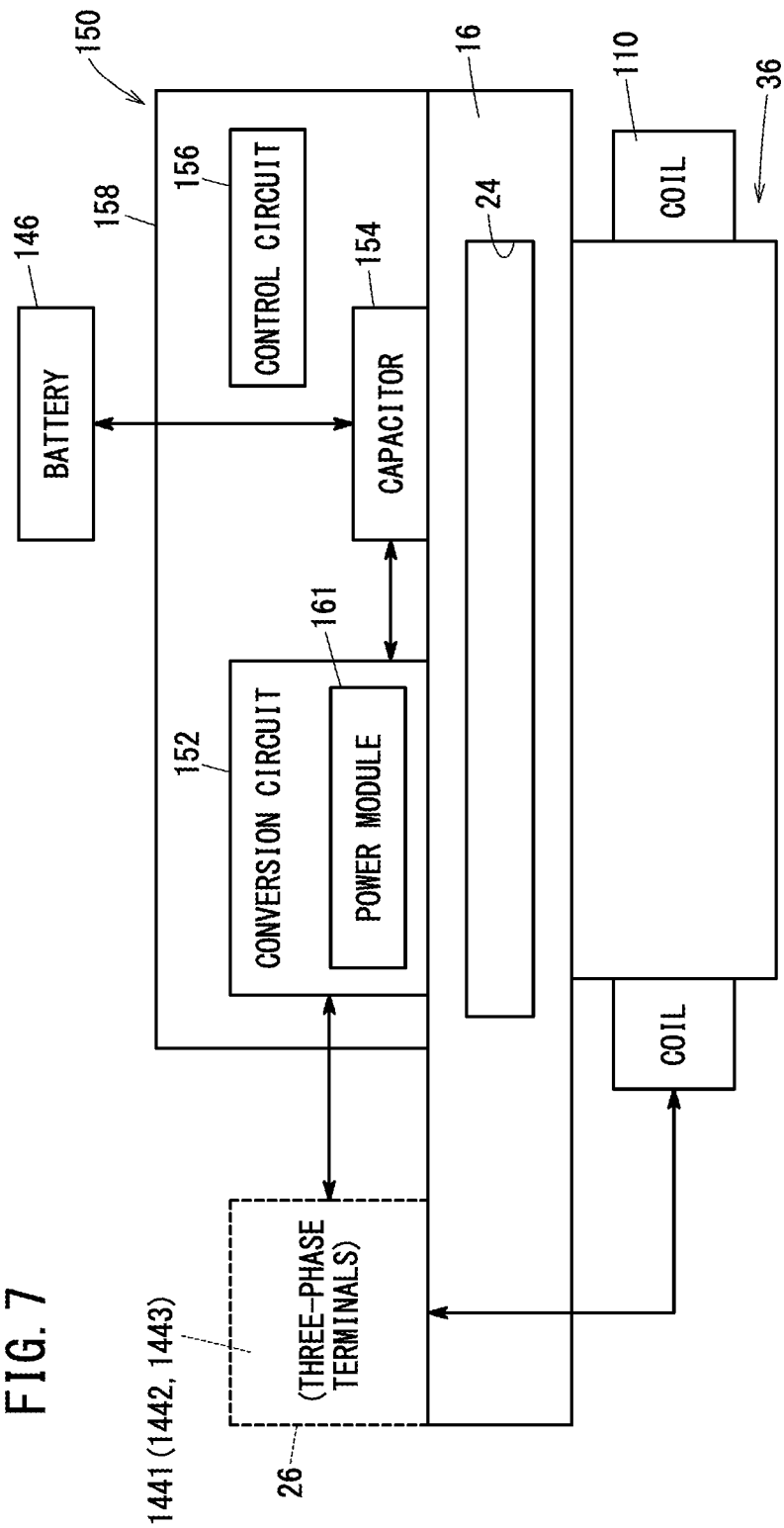
FIG. 7 is a schematic configuration diagram of a current converter provided in a rotating electric machine housing.

As noted previously, the first casing 26 and the second casing 28 are integrally provided on a side wall in close proximity to the left end of the main housing 16. A U-phase terminal 1441, a V-phase terminal 1442, and a W-phase terminal 1443 are accommodated in the first casing 26. The U-phase terminal 1441 is electrically connected to the U-phase coil of the electromagnetic coil 110. The V-phase terminal 1442 is electrically connected to the V-phase coil of the electromagnetic coil 110. The W-phase terminal 1443 is electrically connected to the W-phase coil of the electromagnetic coil 110. The U-phase terminal 1441, the V-phase terminal 1442, and the W-phase terminal 1443 are electric terminal portions to which an external device (an external load or an external power supply) is electrically connected. Electric power generated by the rotating electric machine 12 is supplied to the external device. As the external load, for example, there may be cited a non-illustrated motor. Further, as the external device, for example, there may be cited a battery 146 as shown in FIG. 7.

The second casing 28 is adjacent to the first casing 26. A thermistor 148, which serves as a temperature measuring device, is accommodated in the second casing 28. Although not illustrated in particular, measurement terminals of the thermistor 148 are connected to the electromagnetic coil 110 after having been drawn out from the second casing 28. A harness 149 that is connected to the thermistor 148 is drawn out from the second casing 28.

The internal space of the second casing 28 and the internal space of the first casing 26 are placed in communication with each other through a non-illustrated mutual communication hole. The internal space of the first casing 26 communicates with the accommodation chamber 22.

As shown in FIGS. 1 and 2, a current converter 150 is disposed on an outer circumferential wall of the main housing 16. As shown in FIG. 7, the current converter 150 includes a conversion circuit 152, a capacitor 154, and a control circuit 156. The conversion circuit 152, the capacitor 154, and the control circuit 156 are accommodated inside a device case 158. The device case 158 is arranged, for example, on the outer circumferential wall of the main housing 16 at a location that does not interfere with a first hollow tube portion 1601, a second hollow tube portion 1602, and a third hollow tube portion 1603 (refer to FIG. 1).

The hollow interior parts of the first hollow tube portion 1601, the second hollow tube portion 1602, and the third hollow tube portion 1603 are relay communication passages through which the compressed air flows. More specifically, according to the present embodiment, three of such relay communication passages are formed in the rotating electric machine housing 14.

The conversion circuit 152 includes a power module 161. The conversion circuit 152 converts an AC current (alternating current) generated in the electromagnetic coil 110 into a DC current (direct current). At this time, the capacitor 154 temporarily stores as an electric charge the DC current converted by the conversion circuit 152. The conversion circuit 152 also possesses a function of converting the DC current delivered thereto from the battery 146 into an AC current. In this case, the capacitor 154 temporarily stores the DC current delivered from the battery 146 toward the electromagnetic coil 110 as an electric charge.

The control circuit 156 controls a current density or the like of the DC current that flows from the capacitor 154 toward the battery 146, or the DC current that flows in the opposite direction. Moreover, the DC current from the battery 146 is supplied to the motor (neither of which are shown), for example, via an AC-DC converter.

A compressed air flow passage is provided in the rotating electric machine system 10 which is constituted in the manner described above. A description will now be given concerning such a compressed air flow passage.

Figure 8:
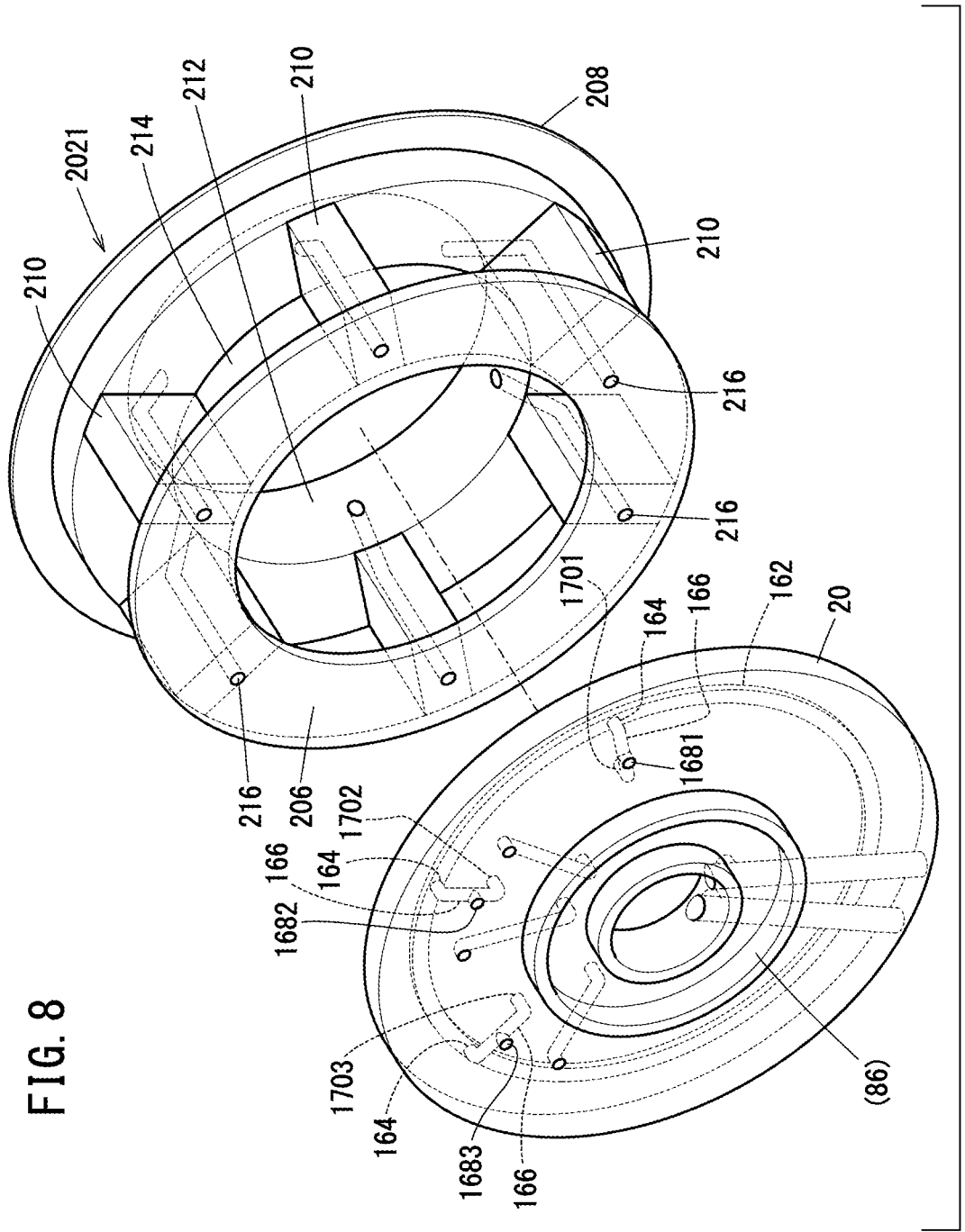
FIG. 8 is a schematic perspective view of a second sub-housing that constitutes part of the rotating electric machine housing, and an inner housing in an engine housing.

As shown in FIG. 8, in the second sub-housing 20, on an end surface thereof facing toward the gas turbine engine 200, an annular shaped collection flow passage 162 is formed therein as an annular concave portion. As will be discussed later, a portion of the compressed air generated by the gas turbine engine 200 flows through the collection flow passage 162. Three upstream communication holes 164 are formed in a bottom wall of the collection flow passage 162 (the annular concave portion). The upstream communication holes 164 serve as input ports for the compressed air.

Air relay paths 166 are provided in the interior of the second sub-housing 20. The air relay paths 166 extend radially along a diametrical direction of the second sub-housing 20. The air relay paths 166 communicate on a diametrical outward side with the collection flow passage 162 via the upstream communication holes 164. Further, in the second sub-housing 20, three first downstream communication holes 1681 to 1683 are formed in an end surface facing toward the rotating electric machine 12. The first downstream communication holes 1681 to 1683 serve as first output ports of the air relay paths 166. A distribution passage is formed by the collection flow passage 162 and the air relay paths 166.

In the second sub-housing 20, three second downstream communication holes 1701 to 1703 are formed in an end surface facing toward the gas turbine engine 200. The second downstream communication holes 1701 to 1703 serve as second output ports of the air relay paths 166. The second downstream communication holes 1701 to 1703 are positioned more radially inward in the diametrical direction than the first downstream communication holes 1681 to 1683. Accordingly, the compressed air that flows through the air relay paths 166 is divided into compressed air that enters into the first downstream communication holes 1681 to 1683, and compressed air that enters into the second downstream communication holes 1701 to 1703.

As shown in FIG. 2, the first hollow tube portion 1601 to the third hollow tube portion 1603 are provided on the outer surface of the side wall of the main housing 16. The first downstream communication holes 1681 to 1683 open respectively into the first hollow tube portion 1601 through the third hollow tube portion 1603. As can be understood from this feature, the air relay paths 166 place the collection flow passage 162 in communication with the hollow interior parts of the first hollow tube portion 1601 through the third hollow tube portion 1603. As shown in FIG. 3, the first hollow tube portion 1601 to the third hollow tube portion 1603 are positioned externally in the diametrical direction of the cooling jacket 24 that is formed in an interior part of the side wall of the main housing 16.

The first hollow tube portion 1601 through the third hollow tube portion 1603 extend along the axial direction of the main housing 16. The hollow interior part of the first hollow tube portion 1601 communicates with the internal space of the second casing 28. The hollow interior parts of the second hollow tube portion 1602 and the third hollow tube portion 1603 communicate with the internal space of the first casing 26. As will be described later, curtain air flowing through the hollow interior part of the first hollow tube portion 1601 flows into the internal space of the second casing 28. Curtain air flowing through the hollow interior parts of the second hollow tube portion 1602 and the third hollow tube portion 1603 flows into the internal space of the first casing 26. As can be understood from such a configuration, the first casing 26 and the second casing 28 are disposed downstream of the portions of the first hollow tube portion 1601 to the third hollow tube portion 1603 that are positioned outside the cooling jacket 24.

As described above, the internal space of the first casing 26 and the internal space of the second casing 28 communicate with each other via the mutual communication hole. The internal space of the first casing 26 communicates with the accommodation chamber 22. Therefore, the compressed air that has flowed through the first hollow tube portion 1601 to the third hollow tube portion 1603 flows into the accommodation chamber 22 via the first casing 26.

In the present embodiment, although a case is exemplified in which the first hollow tube portion 1601 through the third hollow tube portion 1603 are provided, the number of the hollow tube portions is appropriately determined in accordance with a flow rate or a flow velocity required for curtain air to be formed from the compressed air. More specifically, the number of the hollow tube portions is not limited to being three. Further, in a similar manner, the cross-sectional area of the hollow tube portions is appropriately determined in accordance with the flow rate or the flow velocity required to form the curtain air.

The compressed air that has flowed into the accommodation chamber 22 is thereafter divided into compressed air that is directed toward the first insertion hole 78, and compressed air that is directed toward the second insertion hole 86. Specifically, a portion of the compressed air flows through a clearance between the first sub-housing 18 and the rotor 34 toward the first insertion hole 78. In this manner, the clearance between the first sub-housing 18 and the rotor 34 forms a first branching passage L. On the other hand, a part of the remaining portion of the compressed air mainly flows through the clearance between the outer wall of the permanent magnet 72 and the inner wall of the electromagnetic coil 110 and flows toward the second insertion hole 86. In this manner, the clearance between the outer walls of the permanent magnets 72 and the inner wall of the electromagnetic coil 110 forms a second branching passage M.

The compressed air that has reached the first branching passage L forms an air curtain which seals the lubricating oil supplied to the first bearing 74. Further, the compressed air that has reached the second distal end 861 of the second insertion hole 86 from the second branching passage M forms an air curtain which seals the lubricating oil supplied to the second bearing 84. In this manner, the compressed air that has flowed into the accommodation chamber 22 functions as the air curtains.

As shown in FIG. 6, three individual inlet ports 104 are formed in the base portion 98 of the rectifying member 96. An individual one from among the inlet ports is shown in FIG. 6. An individual one of the inlet ports 104 extends to the second downstream communication hole 1701 (not shown). Another individual one of the inlet ports 104 is connected to the second downstream communication hole 1702 (shown in FIG. 6). Further, another individual one of the inlet ports 104 extends to the second downstream communication hole 1703 (not shown). Accordingly, the compressed air output from the second downstream communication holes 1701 to 1703 enters into the relay chamber 106 of the reduced diameter portion 100 of the rectifying member 96 via the inlet ports 104.

The relay chamber 106 extends to the insertion hole 108 that is formed in the top portion 102. In this instance, the relay chamber 106 becomes wider as it comes closer in proximity to the insertion hole 108 and the second sub-branching passage 942. Therefore, as the compressed air flows through the relay chamber 106, the pressure of the curtain air decreases.

The outlet of the relay chamber 106 faces toward the small diameter cylindrical portion 242 of the compressor wheel 222. Accordingly, the compressed air that has entered into the relay chamber 106 comes into contact with the small diameter cylindrical portion 242 of the compressor wheel 222. Thereafter, the compressed air is divided into compressed air that is directed toward the second sub-branching passage 942, and compressed air that is directed toward the outlet passage 943. As a result, the pressure of the compressed air that flows along the second sub-branching passage 942 and toward the second proximal end 862 of the second insertion hole 86 is reduced.

The compressed air that has reached the second proximal end 862 of the second insertion hole 86 from the second sub-branching passage 942 forms an air curtain which seals the lubricating oil supplied to the second bearing 84. Further, the compressed air flowing into the outlet passage 943 is guided to the inside of the first end (open end) of a shroud case 220. The compressed air is drawn back again to the compressor wheel 222.

An exhaust path 172 is formed in the main housing 16. The compressed air that has reached the first branching passage L and the compressed air that has reached the second branching passage M are discharged to the exterior of the main housing 16 through the exhaust path 172.

Figure 9:
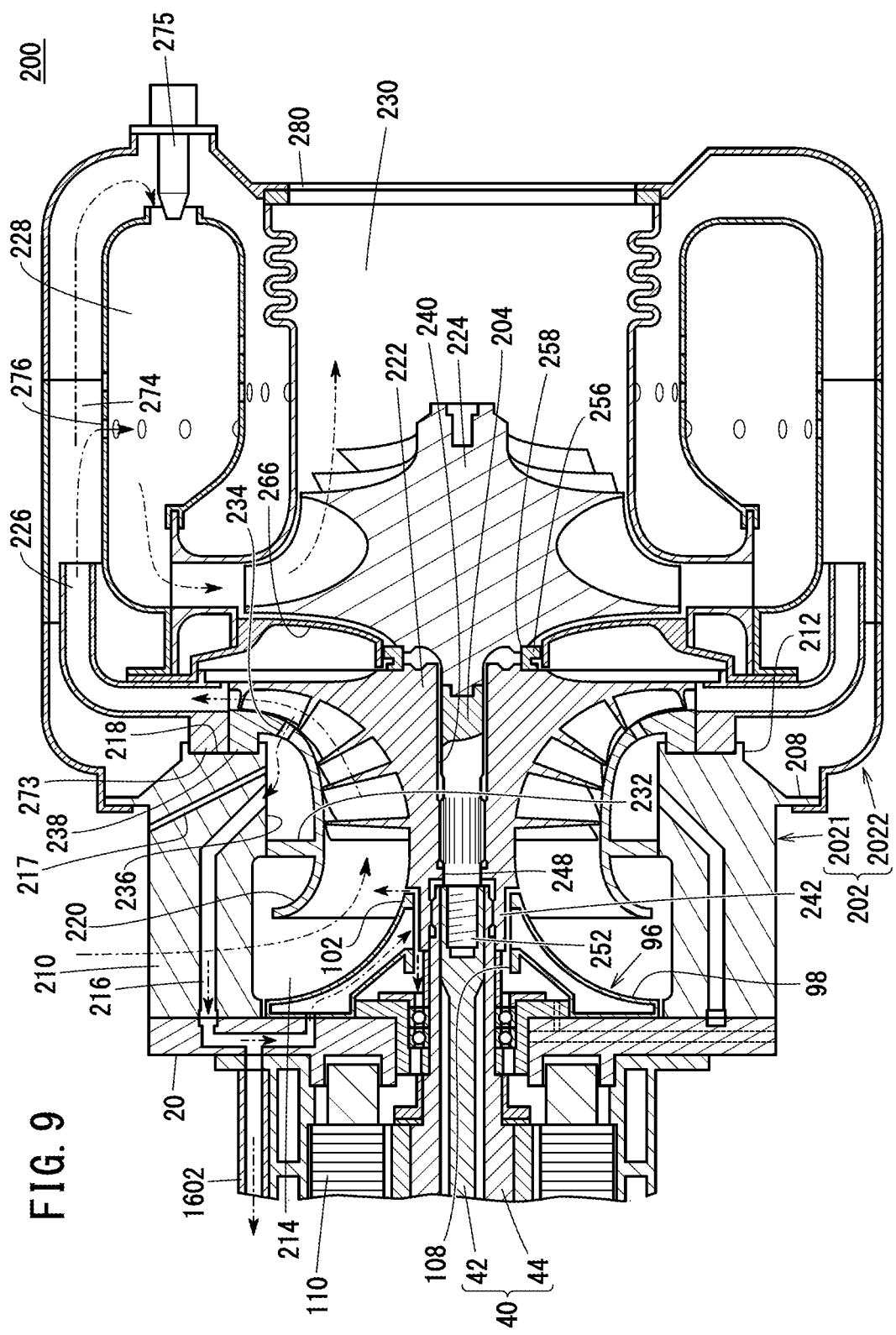
FIG. 9 is a schematic side cross-sectional view of a gas turbine engine that constitutes part of the combined power system.

Next, a description will be given concerning the gas turbine engine 200. As shown in FIG. 9, the gas turbine engine 200 comprises an engine housing 202, and the output shaft 204 that rotates inside the engine housing 202. The engine housing 202 includes an inner housing 2021 and an outer housing 2022. The inner housing 2021 is connected to the second sub-housing 20 of the rotating electric machine system 10. The outer housing 2022 is coupled to the inner housing 2021. The outer housing 2022 forms a housing main body.

As shown in FIG. 1 and FIG. 8, the inner housing 2021 includes a first annular portion 206, a second annular portion 208, and a plurality of individual leg members 210. The first annular portion 206 is connected to the second sub-housing 20. The diameter of the second annular portion 208 is greater than the diameter of the first annular portion 206. The leg members 210 connect the first annular portion 206 and the second annular portion 208. In the illustrated example, the number of the leg members 210 is six. However, the number of the leg members 210 is determined in accordance with the necessary coupling strength required between the gas turbine engine 200 and the rotating electric machine system 10. Stated otherwise, the number of the leg members 210 is not limited to being six as in the illustrated example.

A cylindrically shaped cover member 212 projects out toward the rotating electric machine system 10 from a central opening of the second annular portion 208. Right ends of the leg members 210 continue to the cylindrically shaped cover member 212. An air intake space 214 is formed between the leg members 210.

As shown in FIG. 8 and FIG. 9, air bleed passages 216 are individually formed in the interior of the six leg members 210. In the leg members 210, inlet ports of the air bleed passages 216 are individually formed at connection locations thereof with the cylindrically shaped cover member 212. In the first annular portion 206, outlet ports of the air bleed passages 216 are individually formed on the end surface facing toward the second sub-housing 20. All of the outlet ports of the air bleed passages 216 are positioned on the circumference of a virtual circle. Accordingly, all of the outlet ports of the air bleed passages 216 are superimposed on the collection flow passage 162 which is formed in an annular shape. More specifically, all of the plurality of air bleed passages 216 are in communication with the collection flow passage 162. In this manner, the compressed air from the plurality of air bleed passages 216 flows in and is gathered in the collection flow passage 162.

An air vent hole 217 is formed in one of the leg members 210. The air vent hole 217 linearly extends from an inner wall to an outer wall of the cylindrically shaped cover member 212. The air vent hole 217 is also capable of extending from the inner wall of the cylindrically shaped cover member 212 to an outer wall of the leg member 210. The number of the air vent holes 217 may be one or more. Further, formation of the air vent holes 217 is not strictly essential.

As shown in FIG. 9, an annular shaped engaging concave portion 218 is formed on a right end surface of the second annular portion 208. The shroud case 220 and a diffuser 226 are positioned and fixed in place by the engaging concave portion 218 (to be described later).

As shown in FIG. 9, the gas turbine engine 200 is further equipped with the shroud case 220, the compressor wheel 222, the turbine wheel 224, the diffuser 226, a combustor 228, and a nozzle 230.

The shroud case 220 is a hollow body, and is of a larger scale than the rectifying member 96. A small diameter left end of the shroud case 220 faces toward the rectifying member 96. In the inner housing 2021, a large diameter right end of the shroud case 220 is inserted into the cylindrically shaped cover member 212. The shroud case 220 gradually decreases in diameter from the right end toward the left end, however, the distal end of the left end thereof is curved so as to expand diametrically outward.

The left end of the shroud case 220 is exposed to the air intake space 214. The top portion 102 of the rectifying member 96 enters into the interior of the shroud case 220 at the left end thereof. In the shroud case 220, an annular shaped closing flange portion 232 is provided on a curved side circumferential wall. An outer edge of the closing flange portion 232 abuts against the inner walls of the cylindrically shaped cover member 212 and the leg members 210.

In the side wall of the shroud case 220, air bleed ports 234 are formed between the closing flange portion 232 and a first engaging convex portion 238. Each of the air bleed ports 234 extends from an inner surface to an outer surface of the side wall of the shroud case 220. Each of the air bleed ports 234 serves as an inlet port to a chamber 236 when the compressed air enters into the chamber 236.

The chamber 236 is interposed between the air bleed ports 234 and the air bleed passages 216. That is, the chamber 236 allows the air bleed ports 234 and the air bleed passages 216 to communicate with each other. Further, the chamber 236 is open to the atmosphere through the air vent hole 217.

From the right end of the shroud case 220, the first engaging convex portion 238 projects out toward the second annular portion 208. The first engaging convex portion 238 is engaged with the engaging concave portion 218 of the second annular portion 208. The shroud case 220 is positioned and fixed to the inner housing 2021 due to this engagement and contact of the outer edge of the closing flange portion 232 with the inner walls of the cylindrically shaped cover member 212 and the leg members 210. Simultaneously, the chamber 236 is formed, which is surrounded by the leg members 210, the cylindrically shaped cover member 212, the second annular portion 208, as well as by the closing flange portion 232, the side circumferential wall, and the first engaging convex portion 238 of the shroud case 220. The chamber 236 exhibits an annular shape which surrounds the shroud case 220.

The compressor wheel 222 and the turbine wheel 224 are capable of rotating integrally together with the rotating shaft 40 and the output shaft 204. More specifically, as shown in detail in FIG. 6, the compressor wheel 222 includes the small diameter cylindrical portion 242 at the left end thereof. The small diameter cylindrical portion 242 enters into the insertion hole 108 that is formed in the rectifying member 96. A first outer spline 239 is formed on an inner wall of the small diameter cylindrical portion 242. The first outer spline 239 is enmeshed with the first inner spline 66 formed on the right open end 442 of the outer shaft 44.

The right open end 442 of the outer shaft 44 is press-fitted into a hollow interior part of the small diameter cylindrical portion 242. Therefore, the inner circumferential wall of the small diameter cylindrical portion 242 at the leftward opening, presses the outer circumferential wall of the right open end 442 of the outer shaft 44 diametrically inward. Due to the enmeshment and press-fitting described above, the compressor wheel 222 is connected to the outer shaft 44 (the rotating shaft 40).

A through hole 240 that extends along the left-right direction is formed in a diametrical center of the compressor wheel 222. In the through hole 240, a second outer spline 246 is engraved into the inner wall of the left end thereof. Further, in the through hole 240, a hole diameter of a location contiguous with the hollow interior part of the small diameter cylindrical portion 242 is slightly smaller than that of other locations. Therefore, in the compressor wheel 222, an inner flange portion 248 is provided in close proximity to an opening on the side of the small diameter cylindrical portion 242 of the through hole 240. At the portion where the inner flange portion 248 is provided, the hole diameter (diameter) of the through hole 240 is smallest.

The output shaft 204 provided on the turbine wheel 224 is inserted into the through hole 240. The left distal end of the output shaft 204 extends to substantially the same position as the left distal end of the small diameter cylindrical portion 242 of the compressor wheel 222. As noted previously, the outer circumferential wall of the right open end 442 of the outer shaft 44 is inserted into the hollow interior part of the small diameter cylindrical portion 242. Therefore, the left end of the output shaft 204, which is projected out from the through hole 240, enters into the connecting hole 62 of the rotating shaft 40. A male thread 252 is engraved on the left end of the output shaft 204. The male thread 252 is screwed into the female thread 64 formed on the inner wall of the connecting hole 62. Due to such screw-engagement, the rotating shaft 40 and the output shaft 204 are connected.

A second inner spline 254 is formed in close proximity to the left end of the output shaft 204. The second inner spline 254 meshes with the second outer spline 246 formed on the inner circumferential wall of the through hole 240. Further, a left end part of the output shaft 204 is press-fitted into the inner flange portion 248.

As shown in FIG. 9, a ring member 256 is interposed between the compressor wheel 222 and the turbine wheel 224. The ring member 256, for example, is made up from a heat resistant metal material such as a nickel-based alloy or the like.

Figure 10:
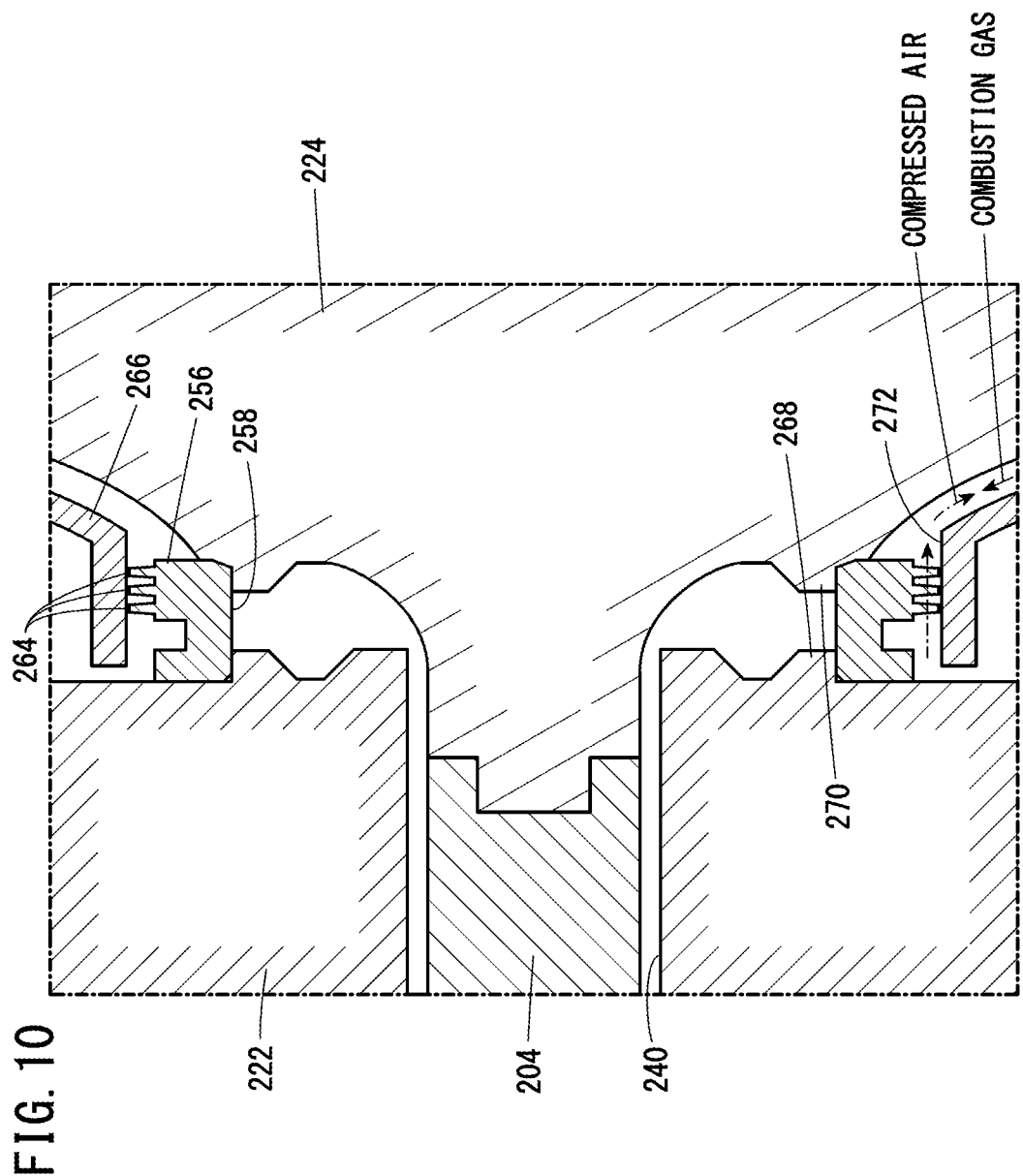
FIG. 10 is an enlarged view of main components shown in FIG. 9.

As shown in FIG. 10, the ring member 256 is formed with a fitting hole 258 therein that extends from the compressor wheel 222 toward the turbine wheel 224. Further, a plurality of (for example, three) labyrinth forming convex portions 264 are formed on the outer circumferential wall of the ring member 256. The labyrinth forming convex portions 264 project out in diametrical directions from the ring member 256, and extend along the circumferential direction of the outer circumferential wall. As will be discussed later, the labyrinth forming convex portions 264 prevent a combusted fuel (an exhaust gas) generated in the combustor 228 from flowing back into the compressor wheel 222.

In the compressor wheel 222, an annular shaped projecting portion 268 projects out from the right end surface that faces toward the turbine wheel 224. At a time when a left end surface of the ring member 256 is seated on a right end surface of the compressor wheel 222, the annular shaped projecting portion 268 is fitted into the fitting hole 258. On the other hand, in the turbine wheel 224, the output shaft 204 extends out from a left end surface thereof that faces toward the compressor wheel 222. Further, a fitting convex portion 270 surrounding the output shaft 204 is formed to project out on the left end surface. When a right end surface of the ring member 256 is seated on the left end surface of the turbine wheel 224, a top surface of the fitting convex portion 270 is fitted into the fitting hole 258. In accordance with the foregoing, the respective parts of the compressor wheel 222 and the turbine wheel 224 are fitted into the fitting hole 258. In such a state, the ring member 256 is sandwiched and held between the compressor wheel 222 and the turbine wheel 224.

The labyrinth forming convex portions 264 are surrounded by an intermediate plate 266 in the hollow interior part of the outer housing 2022 (refer to FIG. 9). The labyrinth forming convex portions 264 are inserted into a hole portion 272 that is formed in the intermediate plate 266. A labyrinth flow path is formed by an inner wall of the hole portion 272 and the labyrinth forming convex portions 264 that abut against the inner wall. Compressed air generated by the compressor wheel 222 reaches the labyrinth forming convex portions 264 via a rear surface of the compressor wheel 222. On the other hand, the combustion gas reaches the labyrinth forming convex portions 264 from the turbine wheel 224. Since the pressure of the compressed air is higher in comparison with the pressure of the combustion gas, it is possible to prevent the combustion gas from passing through the labyrinth forming convex portions 264 and flowing into the space surrounding the compressor wheel 222.

As shown in FIG. 9, within the hollow interior part of the outer housing 2022, respective portions of the shroud case 220 and the compressor wheel 222, as well as the intermediate plate 266 are surrounded by the diffuser 226. A second engaging convex portion 273 is formed on the left end of the diffuser 226. The second engaging convex portion 273 is engaged with the engaging concave portion 218 together with the first engaging convex portion 238 of the shroud case 220. Due to such engagement, the diffuser 226 is positioned and fixed in place in the inner housing 2021.

Within the hollow interior part of the outer housing 2022, the turbine wheel 224 is surrounded by the nozzle 230, and the nozzle 230 is surrounded by the combustor 228. An annular combustion air flow passage 274 is formed between the combustor 228 and the outer housing 2022. The combustion air flow passage 274 is a passage through which combustion air flows. A fuel supply nozzle 275 is positioned and fixed to a right end surface of the outer housing 2022. The fuel supply nozzle 275 supplies fuel to the combustor 228.

Relay holes 276 in order to place the combustion air flow passage 274 and the interior of the combustor 228 in communication with each other are formed in the combustor 228. As will be discussed later, the combustion air that is compressed by the compressor wheel 222 reaches the interior of the combustor 228, via the diffuser 226, the combustion air flow passage 274, and the relay holes 276. Non-illustrated fine holes are also formed in the combustor 228. Air discharged from the fine holes forms an air curtain that serves to cool the interior of the combustor 228.

The nozzle 230 includes a portion that surrounds the largest diameter portion of the turbine wheel 224. A non-illustrated delivery hole (not shown) is formed in this portion for the purpose of supplying fuel, which has undergone combustion together with the combustion air, to the turbine wheel 224. Moreover, it should be noted that, hereinafter, the fuel that has undergone combustion may also be referred to as a "combusted fuel". The term "combusted fuel" is synonymous with the term "combustion gas" or the "exhaust gas after combustion".

An exhaust port 280 opens at the right end of the outer housing 2022 and the nozzle 230. After passing through the delivery hole and into the nozzle 230, by the rotating turbine wheel 224, the combusted fuel is blown out to the exterior of the outer housing 2022 through the exhaust port 280. Moreover, although not shown in particular, an exhaust pipe through which the combusted fuel is discharged is provided in the exhaust port 280.

The rotating electric machine system 10 and the combined power system 400 according to the present embodiment are basically configured as described above. Next, a description will be given concerning the advantageous effects of the rotating electric machine system 10 and the combined power system 400.

In order to initiate operation of the combined power system 400, first, the rotating shaft 40 is rotated by a non-illustrated well known type of starter. Alternatively, electrical power may be supplied from the battery 146 and thereby cause the rotating shaft 40 to rotate.

A description will be given concerning the latter case. In this case, a DC current is supplied from the battery 146. The conversion circuit 152 of the current converter 150 shown in FIG. 2 and FIG. 7 converts such a DC current into an AC current. The AC current is supplied to the electromagnetic coil 110 (the U-phase coil, the V-phase coil, and the W-phase coil) via the U-phase terminal 1441, the V-phase terminal 1442, and the W-phase terminal 1443. By the alternating current flowing through the electromagnetic coil 110, an alternating magnetic field is generated in the stator 36. Therefore, an attractive force and a repulsive force act alternately between the electromagnetic coil 110 and the permanent magnets 72 of the rotor 34. As a result, the rotating shaft 40 begins to rotate.

In this instance, as shown in FIG. 6, the first inner spline 66 is formed on the outer circumferential wall of the right open end 442 of the outer shaft 44, and the first outer spline 239 is formed on the inner wall of the small diameter cylindrical portion 242 of the compressor wheel 222. The first inner spline 66 and the first outer spline 239 enmesh with one another. Furthermore, the second inner spline 254 is formed on the output shaft 204, and the second outer spline 246 is formed on the inner wall of the through hole 240 of the compressor wheel 222. The second inner spline 254 and the second outer spline 246 mesh with each other. Therefore, a rotational torque of the rotating shaft 40 is rapidly transmitted to the output shaft 204 via the compressor wheel 222.

More specifically, when the rotating shaft 40 begins to rotate, the output shaft 204 also starts rotating integrally together with the rotating shaft 40. Along therewith, the compressor wheel 222 and the turbine wheel 224, which are supported by the output shaft 204, rotate together integrally with the output shaft 204. In the foregoing manner, by the first inner spline 66 and the first outer spline 239 being enmeshed, and by the second inner spline 254 and the second outer spline 246 being enmeshed, the rotational torque of the rotating shaft 40 can be sufficiently transmitted to the output shaft 204.

In addition, the right end part of the rotating shaft 40 is press-fitted into the hollow interior part of the small diameter cylindrical portion 242 of the compressor wheel 222. Also, the left end part of the output shaft 204 is press-fitted into the inner flange portion 248 of the compressor wheel 222. Therefore, the axis of the rotating shaft 40 and the axis of the output shaft 204 coincide precisely. In accordance with this feature, the output shaft 204 is sufficiently prevented from rotating in an eccentric manner or while being subjected to vibrations.

Additionally, as shown in FIG. 10, the ring member 256 is interposed between the compressor wheel 222 and the turbine wheel 224. The annular shaped projecting portion 268 on the right end surface of the compressor wheel 222, and the fitting convex portion 270 on the left end surface of the turbine wheel 224 are fitted into the fitting hole 258 of the ring member 256. These fittings also contribute to suppressing eccentric rotation (vibration) of the output shaft 204. Accordingly, there is no particular need to provide a mechanism for suppressing vibration. Further, there is no particular need to increase the diameter of the output shaft 204. In accordance with this feature, it is possible to reduce the size and scale of the combined power system 400.

Furthermore, a frictional force is generated between the right end surface of the compressor wheel 222 and the left end surface of the ring member 256. A frictional force is also generated between the right end surface of the ring member 256 and the left end surface of the turbine wheel 224. Due to such frictional forces, the compressor wheel 222, the ring member 256, and the turbine wheel 224 are kept in close contact with each other. Accordingly, a situation is avoided in which both of the wheels 222 and 224 give rise to rotational misalignment.

Further still, at a time when the combined power system 400 is assembled, due to the above-described fitting, the compressor wheel 222 and the turbine wheel 224 are positioned (centered) with respect to the output shaft 204. In this manner, the ring member 256 is preferably disposed between both of the wheels 222 and 224, and both of the wheels 222 and 224 are preferably fitted individually into the fitting hole 258 of the ring member 256. In accordance with this feature, it becomes easy to center the compressor wheel 222 and the turbine wheel 224 with respect to the output shaft 204.

Due to the above-described rotation, as shown in FIG. 9, atmospheric air is drawn into the shroud case 220 through the air intake space 214 formed between the leg members 210 of the inner housing 2021. In this instance, the rectifying member 96 is positioned at the diametrical center of the inner housing 2021. As discussed previously, the rectifying member 96 is of a mountain-shape (chevron shape) in a manner so as to be reduced in diameter toward the shroud case 220. In addition, the surface of the reduced diameter portion 100 is smooth. Therefore, the atmospheric air that is drawn in is rectified by the rectifying member 96 in a manner so as to flow toward the shroud case 220. Since the right end of the rectifying member 96 enters from the left end opening of the shroud case 220, the atmospheric air is efficiently introduced into the shroud case 220. In this manner, by the rectifying member 96 being shaped in the manner described above, and by the top portion 102 being made to enter into the shroud case 220, the atmospheric air can be efficiently collected by the shroud case 220.

The atmospheric air that is drawn into the shroud case 220 flows between the compressor wheel 222 and the shroud case 220. Since, in comparison with the left opening of the shroud case 220, the space between the compressor wheel 222 and the shroud case 220 is sufficiently narrow, along with flowing therethrough in this manner, the atmospheric air is compressed. More specifically, the compressed air is generated.

The air bleed ports 234 are formed in the shroud case 220. Therefore, a portion of the compressed air is diverted from the air bleed ports 234 as the curtain air, and flows into the chamber 236. The chamber 236 has an annular shape, and also has a large volume compared with the volume of the air bleed ports 234. Therefore, the curtain air that flows into the chamber 236 is temporarily accumulated and retained in the chamber 236.

Since the plurality of air bleed passages 216 are formed, the compressed air is distributed from the chamber 236 to each of the air bleed passages 216. In this case, the curtain air itself that is distributed may differ in pressure. However, in the present embodiment, the compressed air (curtain air) that has passed through the air bleed ports 234 flows into the single annular chamber 236. Consequently, the pressure of the curtain air in the chamber 236 becomes uniform. Stated otherwise, the pressure of the curtain air is equalized. In this manner, the chamber 236 serves as a pressure regulation chamber that regulates the pressure of the curtain air to be substantially constant.

The curtain air that has flowed in from the air bleed ports 234, as has been discussed previously, makes up a portion of the compressed air, and is high in pressure. In this instance, since the volume of the chamber 236 is larger than the volume of the air bleed ports 234, the curtain air spreads out as it flows into the chamber 236. Therefore, the pressure of the curtain air is lowered. As can be understood from this feature, the chamber 236 also serves in a dual manner as a buffer chamber that causes the pressure of the compressed air to be reduced.

In addition to the air bleed passages 216, the air vent hole (or holes) 217 is formed in the inner housing 2021. Excess compressed air is released to the exterior (atmosphere) of the gas turbine engine 200 via the air vent hole 217. Therefore, an excessive increase in the pressure of the curtain air inside the chamber 236 is avoided. More specifically, due to the air vent hole 217, the pressure inside the chamber 236 can be easily adjusted.

Inside the chamber 236, inlet ports of the air bleed passages 216 which are formed individually open into each of the six individual leg members 210. For this reason, the curtain air in the chamber 236 then individually flows through the six air bleed passages 216, and travels toward the second sub-housing 20. As noted previously, at this point in time, the pressure of the curtain air is substantially constant.

As shown in FIG. 8, the outlet ports of all of the six individual air bleed passages 216 overlap with the collection flow passage 162. Accordingly, the curtain air that has flowed through the six individual air bleed passages 216 flows in and is collected in the collection flow passage 162, and then spreads out in an annular shape along the collection flow passage 162. In this process, the pressure of the curtain air is made more uniform.

Furthermore, the curtain air flows individually from the collection flow passage 162 into the three individual upstream communication holes 164, and separately flows along the three individual air relay paths 166. Thereafter, a portion of the curtain air is discharged from the first downstream communication holes 1681 to 1683. The remaining portion of the curtain air is discharged from the second downstream communication holes 1701 to 1703. Hereinafter, the curtain air discharged from the first downstream communication holes 1681 to 1683 is referred to as "first branched air flow". The curtain air that is discharged from the second downstream communication holes 1701 to 1703 will be referred to as a "second branched air flow".

A description will now be given concerning the route of the first branched air flow. The first downstream communication hole 1681 communicates with the hollow interior part of the first hollow tube portion 1601. The first downstream communication hole 1682 communicates with the hollow interior part of the second hollow tube portion 1602. The first downstream communication hole 1683 communicates with the hollow interior part of the third hollow tube portion

1603. Accordingly, the first branched air flow flows through the hollow interior parts of first hollow tube portion 1601 through the third hollow tube portion 1603 shown in FIG. 1, etc., and flows from the second end to the first end of the rotating electric machine housing 14.

The first hollow tube portion 1601 through the third hollow tube portion 1603 are positioned on an outer circumferential portion of the cooling jacket 24. The cooling medium is allowed to flow in advance through the cooling jacket 24. Accordingly, the heat of a first branched air flow is sufficiently conducted to the cooling medium as the first branched air flow flows along the first hollow tube portion 1601 through the third hollow tube portion 1603. Consequently, the first branched air flow becomes a relatively low temperature. More specifically, according to the present embodiment, in accordance with the cooling jacket 24 in order to cool the rotating electric machine 12, the current converter 150, and the like, the temperature of the first branched air flow can also be lowered. Therefore, in the gas turbine engine 200 or the rotating electric machine system 10, there is no need to separately provide cooling equipment in order to cool the curtain air. Accordingly, it is possible to reduce the size and scale of the combined power system 400.

As shown in FIG. 2, the first branched air flow flowing through the first hollow tube portion 1601 flows into the internal space of the second casing 28. Thus, an air curtain is formed in the second casing 28. A surplus amount of the first branched air flow flows into the hollow interior part (internal space) of the first casing 26 through the mutual communication hole. On the other hand, the first branched air flow flowing through each of the second hollow tube portion 1602 and the third hollow tube portion 1603 flows into the internal space of the first casing 26. Therefore, in the first casing 26, an air curtain is formed by the first branched air flow flowing through the second hollow tube portion 1602 and the third hollow tube portion 1603.

As shown in FIG. 3, a surplus amount of the first branched air flow in the first casing 26 flows into the accommodation chamber 22 formed in the main housing 16. As can be understood from such a configuration, the internal spaces of the first casing 26 and the second casing 28 are located upstream in the flow path of the first branched air flow. The accommodation chamber 22 of the main housing 16 is located downstream in the flow path of the first branched air flow.

The first casing 26 and the second casing 28 are disposed at the first end (left end) of the main housing 16. Therefore, the first branched air flow flows in from the left end of the accommodation chamber 22. The first branched air flow then enters into the clearance between the outer circumferential wall of the columnar shaped projecting portion 76 and the insulating base member 112. Such a clearance serves as the inner hole of the stator 36.

A portion of the first branched air flow then flows through the first branching passage L toward the first insertion hole 78. The remaining portion of the first branched air flow flows through the second branching passage M, passes along the clearance between the outer walls of the permanent magnets 72 and the inner wall of the electromagnetic coil 110, and toward the second insertion hole 86. In this manner, the first branched air flow is divided into the compressed air that flows toward the first insertion hole 78 at the left end (the first end) and the compressed air that flows toward the second insertion hole 86 at the right end (the second end).

A portion of the first branched air flow that has flowed toward the first insertion hole 78 reaches the first proximal end 782 of the first insertion hole 78. In the first proximal end 782, a portion of the first branched air flow forms an air curtain for the first bearing 74. On the other hand, the remaining portion of the first branched air flow that has flowed toward the second insertion hole 86 passes through the first sub-branching passage 941 and reaches the second distal end 861 of the second insertion hole 86. In the second distal end 861, the remaining portion of the first branched air flow forms an air curtain for the second bearing 84.

A description will now be given concerning the route of the second branched air flow. The second downstream communication holes 1701 to 1703 individually overlap with the three inlet ports 104 that are formed in the base portion 98 of the rectifying member 96. Accordingly, the second branched air flow flows into the relay chamber 106 (the hollow interior part of the rectifying member 96) through the inlet ports 104.

As noted previously, the outlet of the relay chamber 106 opens at a position that faces toward the small diameter cylindrical portion 242 of the compressor wheel 222. Accordingly, the second branched air flow that has flowed into the relay chamber 106 comes into contact with the small diameter cylindrical portion 242. Thereafter, a portion of the second branched air flow flows toward the second sub-branching passage 942. The remaining portion of the second branched air flow flows toward the outlet passage 943.

The portion of the second branched air flow reaches the second proximal end 862 of the second insertion hole 86 via the second sub-branching passage 942. In the second proximal end 862, the second branched air flow becomes an air curtain for the second bearing 84. As such, the second bearing 84 is sandwiched between the remaining portion of the second branched air flow that has reached the second proximal end 862 and a portion of the first branched air flow that has reached the second distal end 861.

The remaining portion of the second branched air flow passes through the outlet passage 943 and is discharged into the interior of the left end of the shroud case 220. At the left end opening of the shroud case 220, air intake is performed as described above. Accordingly, the remaining portion of the second branched air flow is compressed by the compressor wheel 222 along with the drawn-in atmospheric air.

In the manner described above, the air curtains are formed in the second branching passage M, the first sub-branching passage 941, and the second sub-branching passage 942. Due to these air curtains, the lubricating oil is prevented from entering into the internal spaces of the first casing 26 and the second casing 28. More specifically, the curtain air (the first branched air flow and the second branched air flow) prevents the lubricating oil from scattering from the first bearing 74 and the second bearing 84. Accordingly, a situation is suppressed in which the lubricating oil adheres to the U-phase terminal 1441, the V-phase terminal 1442, the W-phase terminal 1443, the thermistor 148, and the like. In other words, it is possible to prevent electric terminal portions, measuring devices (thermistor 148), and the like from being contaminated by the lubricating oil.

A surplus amount of the first branched air flow passes through the accommodation chamber 22 and reaches the exhaust path 172. A surplus amount of the second branched air flow flows from the second end to the first end of the main housing 16 via, for example, a clearance between an inner wall of the accommodation chamber 22 and the electromagnetic coil 110. Thereafter, the surplus amount of the second branched air flow reaches the exhaust path 172. The first branched air flow and the second branched air flow that have arrived at the exhaust path 172 are recovered by a non-illustrated recovery device.

As noted previously, due to the chamber 236 provided between the inner housing 2021 and the shroud case 220, the pressure of the curtain air is equalized. Accordingly, the occurrence of a pressure distribution in the curtain air is avoided. Further, the occurrence of surging in the curtain air is also avoided. Therefore, while the pressure of the curtain air is maintained substantially constant, it is possible to supply the curtain air circumferentially around the first bearing 74 and the second bearing 84.

As noted previously, the relay chamber 106 becomes wider as it comes closer in proximity to the second sub-branching passage 942. In addition, the second branched air flow that has flowed out from the relay chamber 106 is divided into a portion that is directed toward the second sub-branching passage 942, and a remaining portion that is directed toward the outlet passage 943. Accordingly, the pressure of the second branched air flow that has reached the second proximal end 862 is less than the pressure of the second branched air flow prior to entering into the relay chamber 106. As a result, the pressure of the first branched air flow that has reached the second distal end 861, and the pressure of the second branched air flow that has reached the second proximal end 862 are in balance.

The compressed air that has passed between the shroud case 220 and compressor wheel 222 without entering into the air bleed ports 234 becomes the combustion air. As shown in FIG. 9, the combustion air enters into the diffuser 226. The combustion air flows out from an outlet hole that is formed in a wall portion of the diffuser 226, and into the combustion air flow passage 274 formed between the combustor 228 and the outer housing 2022. Furthermore, the combustion air flows into the combustion chamber (the hollow interior part of the combustor 228) through the relay holes 276 that are formed in the combustor 228, the fine holes, and a clearance formed between the combustor 228 and the fuel supply nozzle 275.

The combustor 228 is placed in a state of being heated beforehand. Accordingly, the combustion chamber is also at a high temperature. Fuel is supplied from the fuel supply nozzle 275 to the high temperature combustion chamber. The fuel is combusted together with the combustion air and becomes a high temperature combusted fuel. When the combusted fuel is supplied from the delivery hole into the nozzle 230, it expands in the nozzle 230. Consequently, the turbine wheel 224 begins to rotate at a high speed.

The output shaft 204 retains the turbine wheel 224. The output shaft 204 is provided with the compressor wheel 222. Therefore, as the turbine wheel 224 rotates at a high speed, the output shaft 204 and the compressor wheel 222 rotate integrally at the high speed. At the same time, the rotating shaft 40 also rotates at the high speed. Moreover, the combusted fuel is discharged to the exterior of the outer housing 2022 through a non-illustrated exhaust pipe provided in the exhaust port 280.

The ring member 256, which is interposed between the compressor wheel 222 and the turbine wheel 224, also serves as a sealing member for sealing the space between both of the wheels 222 and 224. Further, as shown in FIG. 10, the plurality of individual labyrinth forming convex portions 264 are formed on the outer circumferential wall of the ring member 256. The labyrinth forming convex portions 264 abut against the inner wall of the hole portion 272 formed in the intermediate plate 266. The compressed air generated by the compressor wheel 222 reaches the labyrinth forming convex portions 264 via the rear surface of the compressor wheel 222. Further, the combustion gas reaches the labyrinth forming convex portions 264 from the turbine wheel 224. As discussed above, the pressure of the compressed air is higher in comparison with the pressure of the combustion gas. Therefore, an occurrence is suppressed in which the combustion gas passes through the labyrinth forming convex portions 264 and flows into the compressor wheel 222. For the reasons mentioned above, a situation is avoided in which the combusted fuel, for example, enters into the through hole 240 from between both of the wheels 222 and 224.

As shown in FIG. 9, when the output shaft 204 begins to rotate at a high speed, the supply of electrical current from the battery 146 (refer to FIG. 7) to the electromagnetic coil 110 is halted. However, since the turbine wheel 224 is already rotating at a high speed in the manner described above, the rotating shaft 40 rotates at a high speed integrally together with the turbine wheel 224 and the output shaft 204. At this time as well, for the same reasons as mentioned above, a sufficient rotational torque is transmitted from the output shaft 204 to the rotating shaft 40.

As shown in FIG. 3, the direction of rotation of the output shaft 204 and the rotating shaft 40 is preferably opposite to the direction of rotation when the small cap nut 58, the large cap nut 60, and the male thread 252 are screwed together. This is because, in this case, loosening of the small cap nut 58, the large cap nut 60, and the male thread 252 during rotation of the rotating shaft 40 is avoided. Moreover, it should be noted that the small cap nut 58, the large cap nut 60, or the male thread 252 may also be provided with a mechanism in order to prevent loosening thereof.

Since the rotating shaft 40 retains the permanent magnets 72, the AC current is generated in the electromagnetic coil 110 that surrounds the permanent magnets 72. Via the U-phase terminal 1441, the V-phase terminal 1442, and the W-phase terminal 1443, the AC current is delivered to the current converter 150 shown in FIG. 2 and FIG. 7. The conversion circuit 152 of the current converter 150 converts such an AC current into a DC current. At a time when the control circuit 156 of the current converter 150 has determined that the output of an external load (for example, a motor) which is electrically connected to the battery 146 has decreased, the DC current is supplied to the battery 146 (refer to FIG. 7) via the capacitor 154. Consequently, the battery 146 is charged.

Accompanying the electrical current flowing therethrough, the electromagnetic coil 110 generates heat. In this instance, a portion of the first branched air flow comes into contact with the left end of the stator 36. Further, the remaining portion of the first branched air flow that flows past the accommodation chamber 22 and toward the second insertion hole 86 comes into contact with the outer wall and the inner wall of the stator 36. Therefore, the stator 36 is cooled by the first branched air flow. Further, the cooling medium flows through the cooling jacket 24 that is provided in the main housing 16. The rotating electric machine 12 is rapidly cooled by the cooling medium.

According to the present embodiment, the rotating electric machine housing 14 (the main housing 16) in which the rotating electric machine 12 is accommodated, and the first casing 26 in which the U-phase terminal 1441, the V-phase terminal 1442, and the W-phase terminal 1443 are accommodated are separately provided. Therefore, the influence of heat generated in the stator 36 inside the main housing 16 is less likely to affect the U-phase terminal 1441, the V-phase terminal 1442, and the W-phase terminal 1443 in the first casing 26. The U-phase terminal 1441, the V-phase terminal 1442, and the W-phase terminal 1443 also generate heat with energization. However, the U-phase terminal 1441, the V-phase terminal 1442, and the W-phase terminal 1443 are rapidly cooled by the first branched air flow supplied to the first casing 26.

In this manner, the first branched air flow also serves to cool the heat generating locations in the rotating electric machine system 10. Since the electric terminal portions (the U-phase terminal 1441, the V-phase terminal 1442, and the W-phase terminal 1443), the electromagnetic coil 110, the permanent magnets 72, and the like are cooled, a situation may be avoided in which the output control and the like of the rotating electric machine system 10 are affected by heat. Further, it is possible to prevent the magnetization of the electromagnetic coil 110, the permanent magnets 72, and the like from deteriorating due to heat. As a result, the reliability of the rotating electric machine system 10 is enhanced.

Furthermore, since the main housing 16 in which the rotating electric machine 12 is accommodated, and the first casing 26 in which the U-phase terminal 1441, the V-phase terminal 1442, and the W-phase terminal 1443 are accommodated are separately provided, the rotating electric machine 12 and the electric terminal portions are separated away from each other. Therefore, the U-phase terminal 1441, the V-phase terminal 1442, and the W-phase terminal 1443 are less likely to be affected by the influence of vibrations generated accompanying the rotation of the rotor 34. Stated otherwise, the U-phase terminal 1441, the V-phase terminal 1442, and the W-phase terminal 1443 are protected from such vibrations. Further, as discussed previously, in the first bearing 74 and the second bearing 84, the occurrence of seizure is suppressed by the lubricating oil. Accordingly, the rotating electric machine system 10 is superior in terms of durability.

The angle of rotation (the rotational parameter) of the rotating shaft 40 is detected by the resolver 132 while the rotating shaft 40 is undergoing rotation. Specifically, the resolver rotor 56 that is attached to the left end part 422 of the inner shaft 42 rotates together integrally with the rotating shaft 40. Consequently, an electrical signal generated in the resolver stator 130 is transmitted to the receiver via the transmission connector 136. The receiver that has read the electric signals calculates the angle of rotation of the rotating shaft 40 based on the electric signal. The receiver transmits the calculation result to a not illustrated control device or the like. Based on the angle of rotation, the control device or the like calculates the number of rotations.

In the rotating electric machine system 10, the first spigot-fitting portion 571 is formed between the inner shaft 42 and the outer shaft 44. Further, in the rotating electric machine system 10, the second spigot-fitting portion 572 is formed between the large cap nut 60 (restraining member) and the outer shaft 44. Thus, the inner shaft 42 is restrained by the outer shaft 44. Therefore, the inner shaft 42 is less likely to be eccentric with respect to the outer shaft 44. As a result, when the rotor 34 rotates, vibration of the inner shaft 42 with respect to the outer shaft 44 is suppressed.

Thus, the resolver rotor 56 is prevented from eccentrically rotating with respect to the resolver stator 130. Further, vibration of the resolver rotor 56 due to the vibration of the inner shaft 42 is also suppressed. Further, the first bearing 74 and the second bearing 84 that support the rotating shaft 40 are provided in the rotating electric machine housing 14. Therefore, vibrations of the first bearing 74 and the second bearing 84 are suppressed by the rotating electric machine housing 14. Thus, vibration of the resolver 132 is further suppressed.

The resolver 132 is arranged at the projecting distal end 46 exposed from the rotating electric machine housing 14. Accordingly, it is less likely for the resolver 132 to be influenced by heat generated in the electromagnetic coil 110 of the stator 36 inside the rotating electric machine housing 14.

In the foregoing manner, in the present embodiment, the transfer of heat, vibrations, and the like to the resolver 132 is suppressed. Therefore, the resolver 132 is capable of accurately calculating the angle of rotation of the rotating shaft 40. Stated otherwise, the detection result of the angle of rotation calculated by the resolver 132 becomes accurate. Further, the useful lifetime of the resolver 132 is lengthened.

For the reasons described above, even in the case that the diameter of the rotating shaft 40 is small, the rotational parameter of the rotating shaft 40 can be accurately calculated. Accordingly, it is possible to reduce the size and scale of the rotating electric machine system 10 and the combined power system 400.

Cases may occur in which the resolver 132 is replaced by another resolver having a larger inner diameter and outer diameter. In the case that a single solid rotating shaft is adopted as the rotating shaft, and that the resolver is replaced with one having a large inner diameter and outer diameter, it is necessary to replace the rotating shaft with a large-diameter solid rotating shaft. At this time, it is not easy for such a large-diameter solid rotating shaft to be passed through the first bearing 74 and the second bearing 84.

According to the present embodiment, the outer shaft 44 and the inner shaft 42 constitute the rotating shaft 40. Further, the outer shaft 44 passes through the first bearing 74 and the second bearing 84, and the resolver rotor 56 is disposed on a portion of the inner shaft 42 that is exposed from the outer shaft 44. Therefore, at the time when the resolver 132 is replaced with another resolver having a larger inner diameter and outer diameter, the inner shaft 42 can be replaced with an inner shaft, the left end part 422 of which is formed with a larger diameter. As can be understood from this feature, according to the present embodiment, by replacing the inner shaft 42, it is possible to support resolvers having various inner diameters and outer diameters.

As described above, the present embodiment discloses the rotating electric machine system (10) including the rotating electric machine (12) and the rotating electric machine housing (14) configured to rotatably support the rotating shaft (40) of the rotating electric machine, wherein the rotating shaft includes the hollow cylindrical outer shaft (44), and the inner shaft (42) configured to be removably inserted in the hollow interior part of the outer shaft. The outer shaft includes the first outer shaft end part (441) and the second outer shaft end part (442) that are positioned opposite to each other in an axial direction of the rotating shaft, the inner shaft includes the first inner shaft end part (422) and the second inner shaft end part (423) that are positioned opposite to each other in the axial direction, and the first inner shaft end part of the inner shaft includes the projecting distal end (46) that is exposed from the first outer shaft end part of the outer shaft. The rotating electric machine system includes the rotational parameter detector (132) provided on the projecting distal end, and configured to detect the rotational parameter of the rotating shaft, the retaining member (30) provided on the projecting distal end, and configured to retain the rotational parameter detector on the projecting distal end, and the restraining member (60) provided on the projecting distal end, and configured to restrain the inner shaft to the outer shaft.

According to the present invention, the inner shaft is restrained to the outer shaft by the restraining member.

Therefore, the inner shaft is less likely to be eccentric with respect to the outer shaft. Therefore, even when the rotating shaft is rotated at a high speed, it is possible to suppress vibration of the rotating shaft.

Consequently, in the case where the rotating electric machine system has reduced size and scale, it is possible to increase the amount of electrical power by rotating the rotating shaft thereof at a high speed. Also, a long service life of the rotational parameter detector can be achieved.

In the present embodiment, the rotating electric machine system is disclosed, in which the first thread (552) may be formed on an outer surface of the inner shaft, the restraining member may include the second thread (611) screw-engaged with the first thread and the accommodation hole (612) in which the first outer shaft end part is accommodated, and the first outer shaft end part is accommodated in the accommodation hole whereby the restraining member and the first outer shaft end part may be fitted to each other.

In this case, a spigot-fitting portion is formed between the restraining member and the first outer shaft end part. Therefore, the inner shaft is much less likely to be eccentric with respect to the outer shaft.

In the present embodiment, the rotating electric machine system is disclosed, in which the first inner shaft end part and the first outer shaft end part may be fitted to each other.

In this case, a spigot-fitting portion is formed between the first inner shaft end part and the first outer shaft end part. As a result, the inner shaft is much less likely to be eccentric with respect to the outer shaft.

In the present embodiment, the rotating electric machine system is disclosed, in which the first thread may be formed on an outer surface of the inner shaft, the restraining member may include the second thread screw-engaged with the first thread and the accommodation hole in which the first outer shaft end part is accommodated, and the first outer shaft end part is accommodated in the accommodation hole whereby the restraining member and the first outer shaft end part may be fitted to each other, and the first inner shaft end part and the first outer shaft end part may be fitted to each other.

In this case, the spigot-fitting portion is formed between the restraining member and the first outer shaft end part, and the spigot fitting portion is formed between the first inner shaft end part and the first outer shaft end part. Since the two spigot-fitting portions are formed in this manner, it is possible to prevent the inner shaft from being eccentric with respect to the outer shaft.

As a suitable specific embodiment of the rotational parameter detector, there may be cited the resolver. More specifically, in the present embodiment, the rotating electric machine system is disclosed, in which the rotational parameter detector may be the resolver (132) including the resolver rotor (56) and the resolver stator (130), and the resolver rotor may be mounted on the projecting distal end.

In the present embodiment, the rotating electric machine system is disclosed, in which the transmission connector (136) may be provided on the retaining member, and the transmission connector electrically may connect the rotational parameter detector and the receiver configured to receive the signal emitted by the rotational parameter detector.

In this case, the transmission connector can be positioned and fixed to the retaining member.

In the present embodiment, the combined power system (400) is disclosed, in which the combined power system (400) is equipped with the rotating electric machine system (10) and the internal combustion engine (200). The internal combustion engine includes the output shaft (204) configured to rotate integrally with the rotating shaft of the rotating electric machine system. The output shaft is connected to at least one of the second outer shaft end part or the second inner shaft end part.

Along with the rotating electric machine system being made smaller in scale, the combined power system is also made smaller in scale. Also, the combined power system which is made smaller in scale is lightweight.

The present invention is not limited to the embodiment described above, and various additional or modified structures may be adopted therein without departing from the essence and gist of the present invention as set forth in the appended claims.

For example, although in the present embodiment, the resolver 132 is employed as the rotational parameter detector, a detector that includes a Hall element can also be employed.

In the gas turbine engine 200, the compressor wheel 222 and the turbine wheel 224 can also be arranged in a reverse order to that shown in FIG. 9. In this case, the through hole 240 is formed in the turbine wheel 224, and the output shaft 204 is provided in the compressor wheel 222. Apart therefrom, the compressor wheel 222 and the turbine wheel 224 may be of a centrifugal type or an axial flow type. If the compressor wheel 222 and the turbine wheel 224 are arranged on the same axis, a combination of a multi-stage compressor wheel and a multi-stage turbine wheel, which is a combination of a centrifugal type and an axial flow type, may be used.

As shown in FIG. 3, the rotating electric machine 12 constituting the rotating electric machine system 10 may be a motor in which the rotating shaft 40 is rotated by supplying electrical current to the electromagnetic coil 110. In this case, the U-phase terminal 1441, the V-phase terminal 1442, and the W-phase terminal 1443 serve as electric terminal portions that receive the electrical power from the battery 146.

It is also possible to disconnect the rotating electric machine system 10 from the gas turbine engine 200, and for it to be used independently. In a case in which it is necessary to supply the compressed air to the rotating electric machine system 10, a compression pump may be provided externally of the rotating electric machine housing 14, and the compression pump may be used as a gas supply source.

The invention claimed is:

1. A rotating electric machine system comprising a rotating electric machine and a rotating electric machine housing configured to rotatably support a rotating shaft of the rotating electric machine, wherein the rotating shaft includes a hollow cylindrical outer shaft, and an inner shaft configured to be removably inserted in a hollow interior part of the outer shaft;

the outer shaft includes a first outer shaft end part and a second outer shaft end part that are positioned opposite to each other in an axial direction of the rotating shaft;

the inner shaft includes a first inner shaft end part and a second inner shaft end part that are positioned opposite to each other in the axial direction; and the first inner shaft end part of the inner shaft includes a projecting distal end that is exposed from the first outer shaft end part of the outer shaft;

the rotating electric machine system comprising:

a rotational parameter detector provided on the projecting distal end, and configured to detect a rotational parameter of the rotating shaft;

a retaining member provided on the projecting distal end, and configured to retain the rotational parameter detector on the projecting distal end; and a restraining member provided on the projecting distal end, and configured to restrain the inner shaft to the outer shaft.

2. The rotating electric machine system according to claim 1, wherein a first thread is formed on an outer surface of the inner shaft; and the restraining member includes a second thread screw-engaged with the first thread and an accommodation hole in which the first outer shaft end part is accommodated, and the first outer shaft end part is accommodated in the accommodation hole whereby the restraining member and the first outer shaft end part are fitted to each other.

3. The rotating electric machine system according to claim 1, wherein the first inner shaft end part and the first outer shaft end part are fitted to each other.

4. The rotating electric machine system according to claim 1, wherein a first thread is formed on an outer surface of the inner shaft;

the restraining member includes a second thread screw-engaged with the first thread and an accommodation hole in which the first outer shaft end part is accommodated, and the first outer shaft end part is accommodated in the accommodation hole whereby the restraining member and the first outer shaft end part are fitted to each other; and the first inner shaft end part and the first outer shaft end part are fitted to each other.

5. The rotating electric machine system according to claim 1, wherein the rotational parameter detector is a resolver comprising a resolver rotor and a resolver stator, and the resolver rotor is mounted on the projecting distal end.

6. The rotating electric machine system according to claim 1, wherein a transmission connector is provided on the retaining member, and the transmission connector electrically connects the rotational parameter detector and a receiver configured to receive a signal emitted by the rotational parameter detector.

7. A combined power system that is equipped with a rotating electric machine system and an internal combustion engine, the rotating electric machine system including a rotating electric machine, the internal combustion engine including an output shaft configured to rotate integrally with a rotating shaft of the rotating electric machine, wherein the rotating shaft includes a hollow cylindrical outer shaft, and an inner shaft configured to be removably inserted in a hollow interior part of the outer shaft;

the outer shaft includes a first outer shaft end part and a second outer shaft end part that are positioned opposite to each other in an axial direction of the rotating shaft;

the inner shaft includes a first inner shaft end part and a second inner shaft end part that are positioned opposite to each other in the axial direction; and the first inner shaft end part of the inner shaft includes a projecting distal end that is exposed from the first outer shaft end part of the outer shaft;

the rotating electric machine system comprising:

a rotational parameter detector provided on the projecting distal end, and configured to detect a rotational parameter of the rotating shaft;

a retaining member provided on the projecting distal end, and configured to retain the rotational parameter detector on the projecting distal end; and a restraining member provided on the projecting distal end, and configured to restrain the inner shaft to the outer shaft;

wherein the output shaft is connected to at least one of the second outer shaft end part or the second inner shaft end part.

8. The combined power system according to claim 7, wherein a first thread is formed on an outer surface of the inner shaft; and the restraining member includes a second thread screw-engaged with the first thread and an accommodation hole in which the first outer shaft end part is accommodated, and the first outer shaft end part is accommodated in the accommodation hole whereby the restraining member and the first outer shaft end part are fitted to each other.

9. The combined power system according to claim 7, wherein the first inner shaft end part and the first outer shaft end part are fitted to each other.

10. The combined power system according to claim 7, wherein a first thread is formed on an outer surface of the inner shaft;

the restraining member includes a second thread screw-engaged with the first thread and an accommodation hole in which the first outer shaft end part is accommodated, and the first outer shaft end part is accommodated in the accommodation hole whereby the restraining member and the first outer shaft end part are fitted to each other; and the first inner shaft end part and the first outer shaft end part are fitted to each other.

11. The combined power system according to claim 7, wherein the rotational parameter detector is a resolver comprising a resolver rotor and a resolver stator, and the resolver rotor is mounted on the projecting distal end.

12. The combined power system according to claim 7, wherein a transmission connector is provided on the retaining member, and the transmission connector electrically connects the rotational parameter detector and a receiver configured to receive a signal emitted by the rotational parameter detector.

* * * * *